US012654559B2

(12) United States Patent
Fukuoka

(10) Patent No.:   US 12,654,559 B2
(45) Date of Patent:      Jun. 16, 2026

(54) STRADDLE VEHICLE AND VEHICLE CONTROL METHOD

(71) Applicant: KAWASAKI MOTORS, LTD., Akashi (JP)

(72) Inventor: Rui Fukuoka, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 85 days.

(21) Appl. No.: 18/737,008

(22) Filed: Jun. 7, 2024

(65) Prior Publication Data

US 2024/0408967 A1     Dec. 12, 2024

(30) Foreign Application Priority Data

Jun. 8, 2023     (JP) ................................. 2023-095056

(51) Int. Cl.
| | |
|---|---|
| *B60L 7/10* | (2006.01) |
| *B60L 15/20* | (2006.01) |
| *B60L 58/10* | (2019.01) |
| *B62J 43/16* | (2020.01) |

(52) U.S. Cl.
CPC ................. *B60L 7/10* (2013.01); *B60L 15/20* (2013.01); *B60L 58/10* (2019.02); *B62J 43/16* (2020.02); *B60L 2200/12* (2013.01); *B60L 2240/423* (2013.01)

(58) Field of Classification Search
CPC ........................................................ B60L 7/10
See application file for complete search history.

(56) References Cited

U.S. PATENT DOCUMENTS

| | | | | |
|---|---|---|---|---|
| 6,724,165 B2 * | 4/2004 | Hughes | .................. | B60L 50/16 |
| | | | | 303/152 |
| 6,968,265 B2 * | 11/2005 | Wakitani | ................. | B60L 15/18 |
| | | | | 701/1 |
| 7,762,231 B2 * | 7/2010 | Dugas | ....................... | B60L 7/16 |
| | | | | 123/399 |
| 8,919,481 B2 * | 12/2014 | Matsuda | ............ | H05K 7/20927 |
| | | | | 180/220 |

(Continued)

FOREIGN PATENT DOCUMENTS

| | | |
|---|---|---|
| EP | 2189346 A1 | 5/2010 |
| EP | 2314473 A2 | 4/2011 |
| JP | 2010-120597 A | 6/2010 |

*Primary Examiner* — Michael A Berns
(74) *Attorney, Agent, or Firm* — PROCOPIO, CORY, HARGREAVES & SAVITCH LLP

(57)               ABSTRACT

There are provided a straddle vehicle and a method for controlling a vehicle. the straddle vehicle includes: a vehicle body; an electric motor mounted on the vehicle body as a driving source and rotatable in positive and reverse directions; a battery mounted on the vehicle body and configured to supply electric power to the electric motor; and a processing circuitry configured to control the electric motor. The processing circuitry is configured to: acquire vehicle state information capable of determining whether a vehicle state of the straddle vehicle is a forward traveling state or a backward traveling state, and operation information capable of determining whether a user operation is a forward traveling operation or a backward traveling operation; and switch between power running control and regeneration control based on the vehicle state information and the operation information.

16 Claims, 10 Drawing Sheets

(56) References Cited

U.S. PATENT DOCUMENTS

| | | | |
|---|---|---|---|
| 10,322,769 B2 * | 6/2019 | Tanaka | B62M 6/45 |
| 2008/0114523 A1 | 5/2008 | Dugas et al. | |
| 2024/0408967 A1 * | 12/2024 | Fukuoka | B60L 15/20 |
| 2024/0408971 A1 * | 12/2024 | Fukuoka | B60L 58/10 |

* cited by examiner

| VEHICLE STATE | USER OPERATION | CONTROL FORM | SET VALUE TO BE USED |
|---|---|---|---|
| FORWARD TRAVELING STATE | FORWARD TRAVELING OPERATION | POWER RUNNING CONTROL (ROTATION SPEED CONTROL) | FORWARD TRAVELING SET VALUE |
| FORWARD TRAVELING STATE | REFERENCE POSITION OPERATION | FIRST REGENERATION CONTROL (TORQUE CONTROL) | |
| FORWARD TRAVELING STATE | BACKWARD TRAVELING OPERATION | SECOND REGENERATION CONTROL (ROTATION SPEED CONTROL) | |
| BACKWARD TRAVELING STATE | FORWARD TRAVELING OPERATION | SECOND REGENERATION CONTROL (ROTATION SPEED CONTROL) | BACKWARD TRAVELING SET VALUE |
| BACKWARD TRAVELING STATE | REFERENCE POSITION OPERATION | FIRST REGENERATION CONTROL (TORQUE CONTROL) | |
| BACKWARD TRAVELING STATE | BACKWARD TRAVELING OPERATION | POWER RUNNING CONTROL (ROTATION SPEED CONTROL) | |

FIG. 8
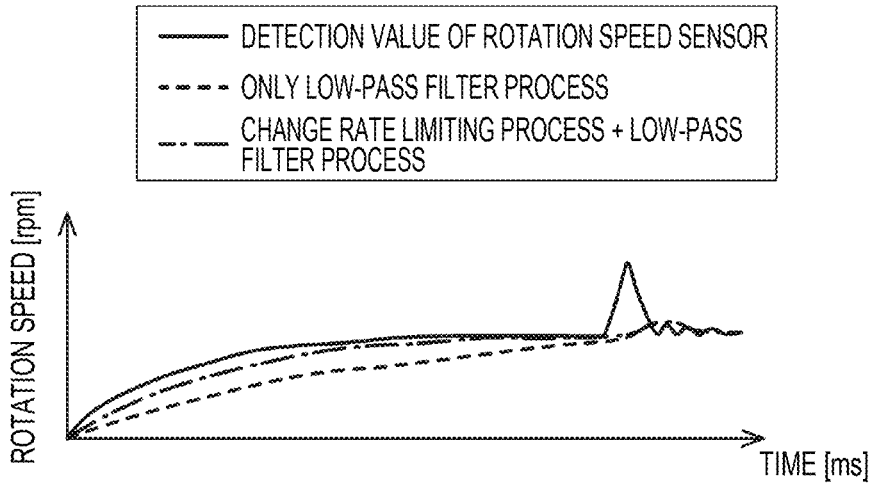
FIG. 9
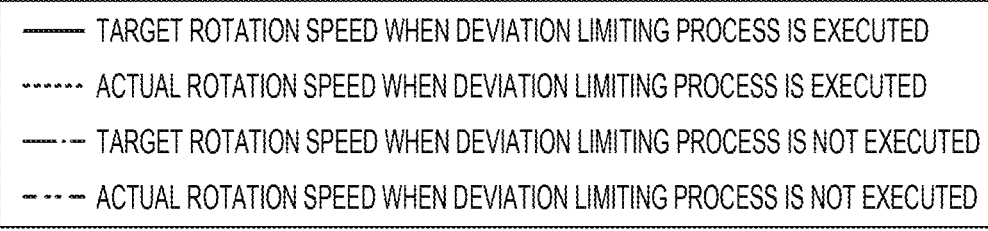
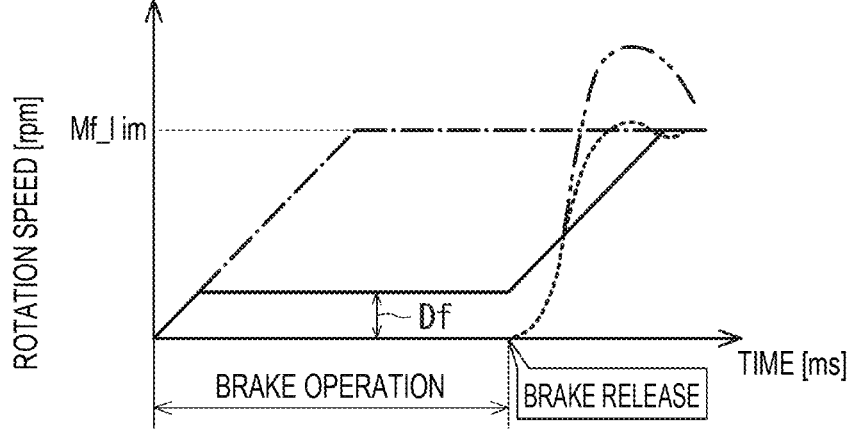

STRADDLE VEHICLE AND VEHICLE CONTROL METHOD

CROSS-REFERENCE TO RELATED APPLICATIONS

This application is based on and claims priority under 35 USC 119 from Japanese Patent Application No. 2023-095056 filed on Jun. 8, 2023, the contents of which are incorporated herein by reference.

TECHNICAL FIELD

The present disclosure relates to a straddle vehicle and a vehicle control method.

BACKGROUND ART

JP2010-120597A discloses a vehicle capable of traveling forward and backward.

In response to a user operation of a vehicle capable of traveling forward and backward as described above, there is a demand for a user to approach the intended feeling.

SUMMARY OF INVENTION

An aspect of the present disclosure provides a straddle vehicle in which a feeling felt by a user when a traveling operation of the vehicle is performed is easily brought close to a feeling intended by the user, and a vehicle control method.

According to an illustrative aspect of the present disclosure, a straddle vehicle includes: a vehicle body; an electric motor mounted on the vehicle body as a driving source and rotatable in positive and reverse directions; a battery mounted on the vehicle body and configured to supply electric power to the electric motor; and a processing circuitry configured to control the electric motor. The processing circuitry is configured to: acquire vehicle state information capable of determining whether a vehicle state of the straddle vehicle is a forward traveling state or a backward traveling state, and operation information capable of determining whether a user operation is a forward traveling operation or a backward traveling operation; and switch between power running control and regeneration control based on the vehicle state information and the operation information.

According to another illustrative aspect of the present disclosure, a straddle vehicle includes: a vehicle body; an electric motor mounted on the vehicle body as a driving source; a battery mounted on the vehicle body and configured to supply electric power to the electric motor; and a processing circuitry configured to control the electric motor. The processing circuitry is configured to: determine whether the vehicle state is a slow-speed traveling state in which a regeneration amount is equal to or less than a predetermined value based on the vehicle state information at the time of the regeneration control, limit a required regeneration torque, which is a regeneration torque required for the electric motor, in a case where the processing circuitry determines that the vehicle state is not the slow-speed traveling state, and reduce a limit on the required regeneration torque in a case where the processing circuitry determines that the vehicle state is the slow-speed traveling state as compared with the case where the processing circuitry determines that the vehicle state is not the slow-speed traveling state.

According to another illustrative aspect of the present disclosure, a straddle vehicle includes: a vehicle body; an electric motor mounted on the vehicle body as a driving source; a battery mounted on the vehicle body and configured to supply electric power to the electric motor; an operator configured to: receive a first movement operation performed by a user, and move in a first direction with respect to a reference position; and receive a second movement operation performed by the user, and move in a second direction with respect to the reference position; and a processing circuitry configured to control the electric motor. The processing circuitry is configured to: execute power running control in a case where the vehicle state is a traveling state and a user operation is the first movement operation; execute first regeneration control in a case where the vehicle state is the traveling state and the user operation is a reference position operation; and execute second regeneration control when the vehicle state is the traveling state and the user operation is the second movement operation. A regeneration amount by the second regeneration control is larger than a regeneration amount by the first regeneration control.

According to another illustrative aspect of the present disclosure, a method for controlling a vehicle including an electric motor rotatable in positive and reverse directions and a processing circuitry, which is executed in the processing circuitry, includes: acquiring vehicle state information capable of determining whether a vehicle state of the vehicle is a forward traveling state or a backward traveling state and operation information capable of determining whether a user operation is a forward traveling operation or a backward traveling operation; and switching between power running control and regeneration control based on the vehicle state information and the operation information.

According to the present disclosure, the feeling felt by the user when the traveling operation of the vehicle is performed can be brought close to the feeling intended by the user.

BRIEF DESCRIPTION OF DRAWINGS

FIG. 1 is a schematic view of a vehicle according to an embodiment.

FIG. 4 is a table showing a correspondence relation of a vehicle state, a user operation, a control form, and a set value during low-speed control.

FIG. 8 is a graph illustrating noise removal from an actual rotation speed performed by a change rate limiting unit and a filter processing unit in FIG. 7.

FIG. 9 is a graph illustrating a deviation limiting process performed by a deviation limiting unit in FIG. 7.

DESCRIPTION OF EMBODIMENTS

Figure 2:
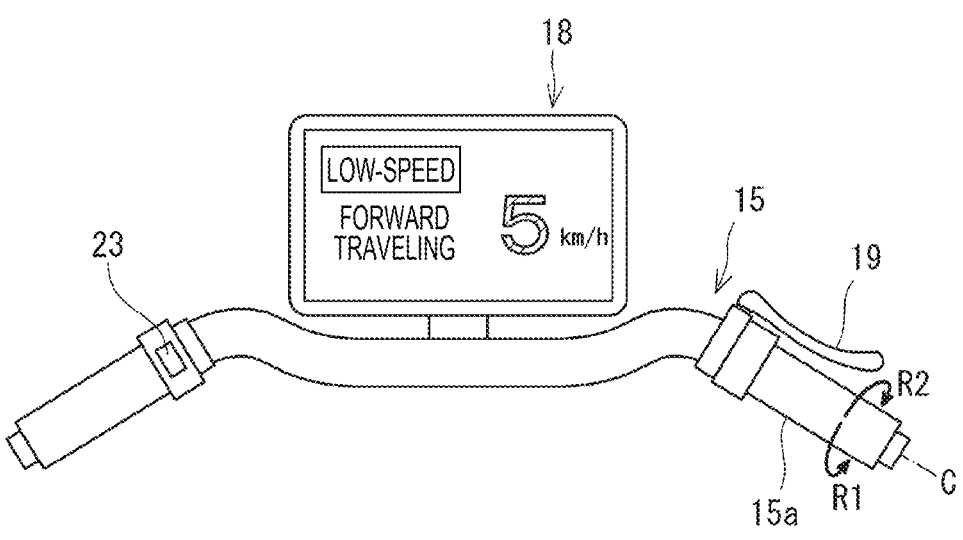
FIG. 2 is an enlarged view of the vicinity of a steering wheel and a meter device of the vehicle in FIG. 1.

Hereinafter, embodiments will be described with reference to the drawings.

(Configuration of Vehicle)

Figure 1:
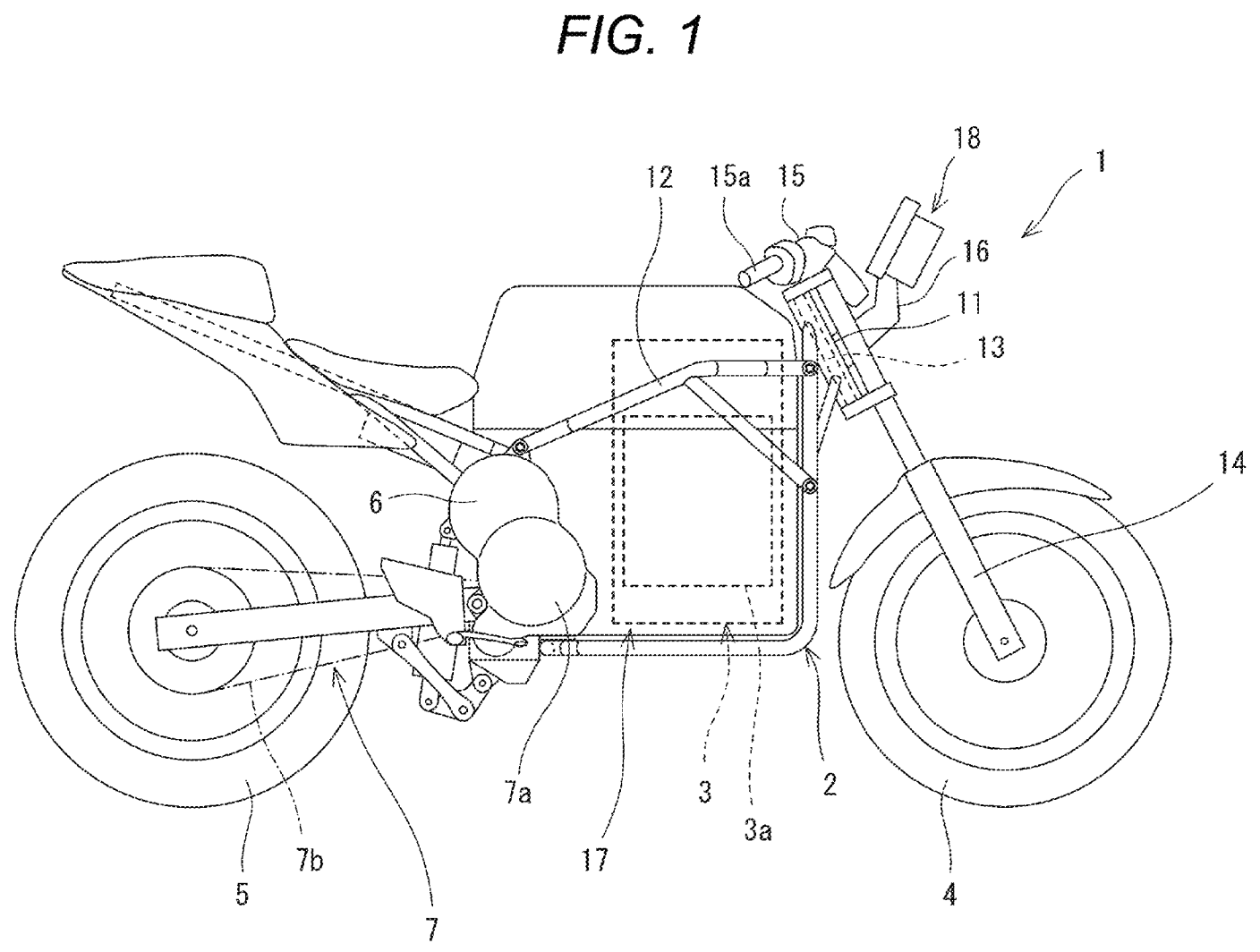

FIG. 1 is a schematic view of a vehicle 1 according to an embodiment. In the present embodiment, the vehicle 1 is a straddle-type electric motorcycle. The vehicle 1 includes a vehicle body 2 and a battery pack 3. The battery pack 3 is detachable from the vehicle body 2. However, the battery pack 3 may not be detachable from the vehicle body 2. The vehicle body 2 is supported by a front wheel 4, which is a driven wheel, and a rear wheel as a driving wheel. An electric motor 6 as a traveling driving source is supported by the vehicle body 2.

The electric motor 6 generates a traveling driving force to be transmitted to the rear wheel 5 as a driving wheel. The driving torque generated by the electric motor 6 is transmitted to the rear wheel 5 via a power transmission mechanism 7. The electric motor 6 is rotatable forward and backward. The electric motor 6 not only functions as a traveling driving source, but also functions as a generator during deceleration of the vehicle 1. The electric motor 6 is provided with a rotation speed sensor 22 (see FIG. 3) that detects a rotation speed of an output shaft of the electric motor 6. The power transmission mechanism 7 includes a speed reducer 7a that decelerates rotation of the electric motor 6, and a mechanism 7b (for example, a chain transmission mechanism, or a belt transmission mechanism) that transmits rotational power output from the speed reducer 7a to an axle of the rear wheel 5.

The vehicle body 2 includes a vehicle body frame, and the vehicle body frame includes a head pipe 11 and a pair of left and right main frames 12 that extend rearward from the head pipe 11. The head pipe 11 rotatably supports a steering shaft 13. A front fork 14 extending substantially in an up-down direction is connected to the steering shaft 13, and the front wheel 4 is rotatably supported at a lower end portion of the front fork 14. A battery case 17 is disposed between the pair of main frames 12 that extend in a left-right direction. The battery case 17 is fixed to the pair of main frames 12. The battery pack 3 is housed in the battery case 17. A bar-type steering wheel 15 extending in the left-right direction is connected to an upper end portion of the steering shaft 13. A meter device 18 supported by the head pipe 11 via a bracket 16 is disposed on a front side of the steering wheel 15.

FIG. 2 is an enlarged view of the vicinity of the steering wheel 15 and the meter device 18 of the vehicle 1 in FIG. 1. The steering wheel 15 is provided with a torque command operator 15a that receives an operation of generating a driving torque by the electric motor 6. In the present embodiment, the torque command operator 15a is a right grip of the steering wheel 15. The torque command operator 15a is pivotable around a center axis C extending in a longitudinal direction within a predetermined angle range.

The torque command operator 15a is configured to return to a predetermined reference position when a user (that is, a driver) is not operated. The torque command operator 15a can pivot in a first movement direction R1 around the center axis C from a predetermined reference position and pivot in a second movement direction R2 opposite to the first movement direction R1 around the center axis C from the reference position. The torque command operator 15a is urged to the reference position when not operated. When the torque command operator 15a pivots from the reference position in the first movement direction R1 or the second movement direction R2, a movement direction of the torque command operator 15a and an operation amount from the reference position (hereinafter referred to as an accelerator operation amount) are detected by an accelerator sensor 21 (see FIG. 3).

A brake lever 19 is disposed in front of the right grip which is the torque command operator 15a. The brake lever 19 is a torque command operator for operating a front wheel brake mechanism disposed on the front wheel 4. When the brake lever 19 is pulled forward, the front wheel brake mechanism is operated to apply a mechanical braking force to the front wheel 4.

A mode switching switch 23 is disposed on a side opposite to a side where the torque command operator 15a of the steering wheel 15 is positioned in the left-right direction, that is, on a left side portion of the steering wheel 15. The mode switching switch 23 receives a user operation for switching a control mode of a controller 31 to be described later between a normal traveling mode and a low-speed mode.

The normal traveling mode is a mode in which a torque of the electric motor 6 is changed in accordance with an operation amount of the torque command operator 15a by the user. Specifically, in the normal traveling mode, the controller 31 increases an output as the operation amount of the torque command operator 15a in the first movement direction increases. When the torque command operator 15a pivots in the first movement direction R1 from the reference position in the normal traveling mode, the electric motor 6 generates a driving torque in accordance with an operation amount by which the torque command operator 15a pivots in the first movement direction R1 from the reference position. The normal traveling mode is set as a mode for traveling on a traveling road. For example, in the normal traveling mode, when a minimum traveling speed is set in the traveling road, the vehicle can travel at a speed exceeding the minimum traveling speed.

The low-speed mode is a mode in which a maximum traveling speed is limited compared to the normal traveling mode and the vehicle 1 travels in a low-speed traveling state. That is, in the low-speed mode the maximum traveling speed is set lower than that in the normal traveling mode. For example, when the vehicle 1 includes a rotation speed limiter that limits a maximum rotation speed of the electric motor 6, the maximum traveling speed in the normal traveling mode is a traveling speed when the vehicle 1 rotates at the maximum rotation speed limited by the rotation speed limiter in the normal traveling mode, and the maximum traveling speed in the low-speed mode is set to be lower than the traveling speed. The low-speed mode can be used, for example, when the vehicle 1 is parked from the traveling road to a parking lot or moved from the parking lot to the traveling road. In addition, the low-speed mode can be used for a direction change using backward steering, a movement from a stop state on a slope to a start position, or the like. In the low-speed mode, the speed may be set to about a walking speed as the maximum traveling speed.

In the low-speed mode, the vehicle 1 can travel forward or backward in the low-speed traveling state in accordance with an operation on the torque command operator 15a. For example, when the torque command operator 15a pivots by a first angle or more in the first movement direction R1 from the reference position in the low-speed mode, the vehicle 1 travels forward slowly with a maximum forward traveling speed set in the low-speed mode as an upper limit. When the torque command operator 15a pivots by a second angle or more in the second movement direction R2 from the reference position in the low-speed mode, the vehicle 1 travels backward slowly with a maximum backward traveling speed set in the low-speed mode as an upper limit.

As shown in FIG. 2, the meter device 18 displays whether a control mode of the controller 31 is the normal traveling mode or the low-speed mode in a distinguishable manner. For example, when the selected control mode is the low-speed mode, the meter device 18 may display a set of information related to an absolute value of a traveling speed and information related to whether a traveling direction of the vehicle 1 is a forward traveling direction or a backward traveling direction. In addition, the meter device 18 may display various kinds of information such as a motor rotation speed and a battery remaining amount.

(Electrical Configuration)

Figure 3:
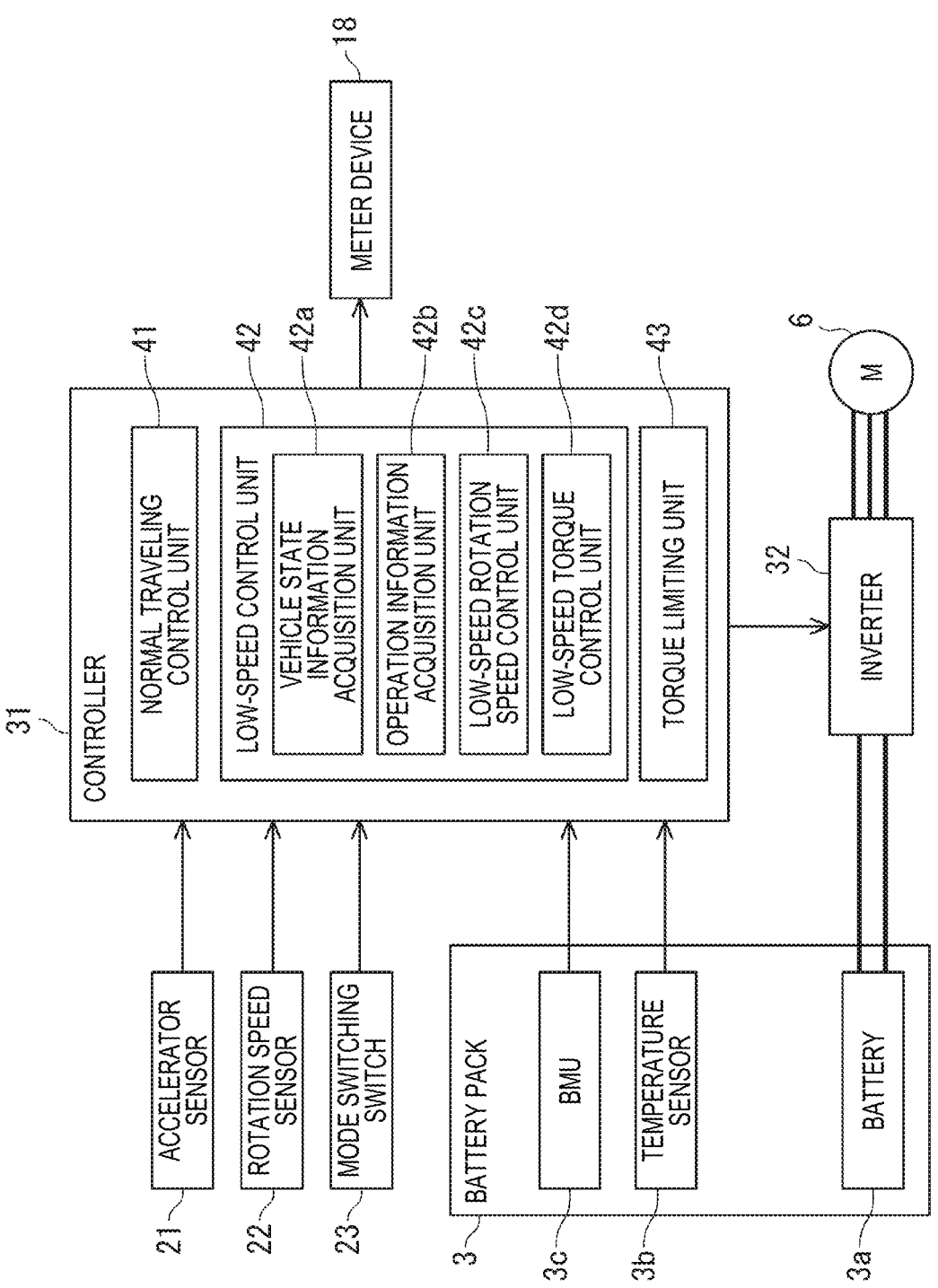
FIG. 3 is a block diagram showing an electrical configuration of the vehicle in FIG. 1.

FIG. 3 is a block diagram showing an electrical configuration of the vehicle 1 in FIG. 1. The controller 31 and an inverter 32 are fixed to the vehicle body 2 of the vehicle 1. The controller 31 includes a processor, a memory, and an I/O interface in terms of hardware. The memory includes, for example, a storage such as a hard disk or a flash memory, and a main memory which is a RAM. The storage stores a program for issuing a control command to the electric motor 6. The processor, the memory, and the like included in the controller 31 are examples of a processing circuitry.

The controller 31 receives accelerator operation amount information indicating an accelerator operation amount detected by the accelerator sensor 21. The accelerator operation amount information detected by the accelerator sensor 21 includes information related to a movement direction and a movement amount of the torque command operator 15a from the reference position by the user operation.

The controller 31 receives motor rotation speed information indicating a motor rotation speed detected by the rotation speed sensor 22.

The controller 31 receives, from the mode switching switch 23, a mode switching signal for switching a control mode from the normal traveling mode to the low-speed mode or from the low-speed mode to the normal traveling mode. The controller 31 switches the control mode between the normal traveling mode and the low-speed mode based on the received mode switching signal. The mode switching switch 23 may transmit the mode switching signal to the controller 31 by being long-pressed, or may transmit the mode switching signal to the controller 31 by being short-pressed. In the present embodiment, the mode switching signal may be transmitted from the mode switching switch 23 to the controller 31 when the user continues to press the mode switching switch 23 for a predetermined time in a traveling stopped state of the vehicle 1. In this case, when the current control mode is the normal traveling mode, the controller 31 switches to the low-speed mode. When the current control mode is the low-speed mode, the controller 31 switches to the normal traveling mode.

When the controller 31 receives the mode switching signal related to switching from the normal traveling mode to the low-speed mode, the controller 31 may determine whether a predetermined mode switching condition for switching from the normal traveling mode to the low-speed mode is satisfied, and switch from the normal traveling mode to the low-speed mode in response to determining that the mode switching condition is satisfied. For example, the mode switching condition may include a condition that the vehicle speed is equal to or lower than a predetermined speed. For example, the mode switching condition may include a condition that the motor rotation speed is equal to or lower than a predetermined rotation speed. When the vehicle 1 includes a transmission device that changes a gear ratio, for example, the mode switching condition may include a condition that a transmission gear ratio is a predetermined gear ratio.

The controller 31 also communicates with an electronic device built in the battery pack 3. The battery pack 3 includes a battery 3a, a temperature sensor 3b, and a battery management unit (BMU) 3c. The battery 3a includes a plurality of battery cells connected in series. The temperature sensor 3b detects a temperature of the battery 3a.

The battery management unit 3c includes a processor, a memory, an I/O interface, and the like in terms of hardware. The memory includes, for example, a storage such as a hard disk or a flash memory, and a main memory which is a RAM. The memory of the battery management unit 3c stores battery identification information for identifying the battery pack 3, and limit information related to a limiting value of a discharge current of the battery 3a and a limiting value of a charge current of the battery 3a.

The battery management unit 3c estimates the quantity of electricity stored in the battery 3a, that is, a state of charge (SOC) of the battery 3a. For example, the battery pack 3 may include a voltage sensor that detects a voltage value of each battery cell of the battery 3a and a current sensor that detects a charge current to the battery 3a and a discharge current from the battery 3a, and the battery management unit 3c may estimate the state of charge of the battery 3a from the voltage value of each battery cell detected by the voltage sensor, an amount of current to be charged or discharged and detected by the current sensor, and the like.

The controller 31 receives, from the battery pack 3, battery temperature information indicating the temperature of the battery 3a detected by the temperature sensor 3b and state of charge information (hereinafter also referred to as SOC information) indicating the state of charge of the battery 3a estimated by the battery management unit 3c.

The controller 31 and the inverter 32 are communicably connected to each other. The battery 3a is electrically connected to the electric motor 6 via the inverter 32. The controller 31 sends a control command to the inverter 32 to control the inverter 32. Under the control of the controller 31, the inverter 32 converts DC power discharged from the battery 3a into AC power and supplies the AC power to the electric motor 6, or converts AC power generated by the electric motor 6 into DC power using power transmitted from the rear wheel as a driving wheel and supplies the DC power to the battery 3a to charge the battery 3a.

The controller 31 includes a normal traveling control unit 41, a low-speed control unit 42, a torque limiting unit 43, and the like in terms of functions. The normal traveling control unit 41, the low-speed control unit 42, and the torque limiting unit 43 are implemented by the processor performing an arithmetic process on the program read from the storage to the main memory.

The normal traveling control unit 41 controls the electric motor 6 when the control mode of the controller 31 is the normal traveling mode. More specifically, the memory of the controller 31 stores correspondence relation information indicating a correspondence relation between the accelerator operation amount, the motor rotation speed, and the torque. The correspondence relation information may be, for example, a torque map or an arithmetic expression. The correspondence relation information may be information indicating the correspondence relation between the accelerator operation amount and the torque at least. When the control mode of the controller 31 is the normal traveling mode, the normal traveling control unit 41 refers to the correspondence relation information, acquires a torque corresponding to an accelerator operation amount indicated by the received accelerator operation amount information and a motor rotation speed indicated by the received motor rotation speed information, and determines the torque as a required torque Tr required for the electric motor 6.

The low-speed control unit 42 controls the electric motor 6 when the control mode of the controller 31 is the low-speed mode. The low-speed control unit 42 includes a vehicle state information acquisition unit 42a, an operation information acquisition unit 42b, a low-speed rotation speed control unit 42c, and a low-speed torque control unit 42d.

The vehicle state information acquisition unit 42a acquires vehicle state information indicating a state of the vehicle 1. The vehicle state information is information capable of determining whether the vehicle state is the forward traveling state or the backward traveling state. The vehicle state information acquisition unit 42a acquires the vehicle state information by determining the vehicle state from the motor rotation speed information.

In the present embodiment, when the motor rotation speed information indicates that the electric motor 6 rotates in a positive direction, the vehicle state information acquisition unit 42a determines that the vehicle state is the forward traveling state. When the motor rotation speed information indicates that the electric motor 6 rotates in a negative direction, the vehicle state information acquisition unit 42a determines that the vehicle state is the backward traveling state. In the present specification, the positive direction of the electric motor 6 is a rotation direction of the electric motor 6 that generates a driving torque for accelerating the vehicle 1 forward, and the negative direction of the electric motor 6 is a rotation direction of the electric motor 6 that generates a driving torque for accelerating the vehicle 1 rearward. When the motor rotation speed information indicates that the motor rotation speed is zero, the vehicle state information acquisition unit 42a determines that the vehicle state is a stopped state.

The operation information acquisition unit 42b acquires operation information indicating an operation content of the user for the torque command operator 15a in the low-speed mode. The operation information is information capable of determining whether the user operation in the low-speed mode is the forward traveling operation or the backward traveling operation, and the user operation is a reference position operation. The operation information acquisition unit 42b acquires a determination result as the operation information by determining which of the forward traveling operation, the backward traveling operation, and the reference position operation corresponds to the user operation from the accelerator operation amount information.

In the present embodiment, when the accelerator operation amount information indicates that a position of the torque command operator 15a is at a position where the torque command operator 15a pivots by the first angle or more in the first movement direction R1 from the reference position, the operation information acquisition unit 42b determines that the user operation is the forward traveling operation as a first movement operation. When the accelerator operation amount information indicates that the position of the torque command operator 15a is at a position where the torque command operator 15a pivots by the second angle or more in the second movement direction R2 from the reference position, the operation information acquisition unit 42b determines that the user operation is the backward traveling operation as a second movement operation.

In a case where it is determined that the user operation is neither the forward traveling operation nor the backward traveling operation, the operation information acquisition unit 42b determines that the user operation is the reference position operation. That is, when the accelerator operation amount information indicates that the position of the torque command operator 15a is at a position less than the first angle in the first movement direction R1 from the reference position and less than the second angle in the second movement direction R2 from the reference position, the operation information acquisition unit 42b determines that the user operation is the reference position operation.

When the user does not operate the torque command operator 15a, the torque command operator 15a returns to the reference position, and thus even when no user operation is performed on the torque command operator 15a, the user operation is determined to be the reference position operation.

The low-speed rotation speed control unit 42c executes rotation speed control in which an actual rotation speed of the electric motor 6 is brought close to a target rotation speed in the low-speed mode. The rotation speed control by the low-speed rotation speed control unit 42c is selected and executed when a rotation speed control condition is satisfied in the low-speed mode. For example, the rotation speed control condition is a condition that the vehicle is in a traveling state and the user operation is the forward traveling operation or the backward traveling operation. The low-speed rotation speed control unit 42c controls a rotation speed so that the actual rotation speed is brought close to the target rotation speed. Specifically, the low-speed rotation speed control unit 42c calculates a torque for bringing the actual rotation speed close to the target rotation speed based on a deviation between the actual rotation speed and the target rotation speed, and determines the torque as the required torque Tr required for the electric motor 6. Details of the rotation speed control by the low-speed rotation speed control unit 42c will be described later.

The low-speed torque control unit 42d executes predetermined torque control. The torque control by the low-speed torque control unit 42d is selected and executed when a torque control condition is satisfied in the low-speed mode. As will be described later, when the vehicle is in the traveling state and the user operation is the reference position operation, the torque control condition is satisfied, and the torque control by the low-speed torque control unit 42d is selected. The low-speed torque control unit 42d acquires a regeneration torque corresponding to the motor rotation speed indicated by the motor rotation speed information, and determines the regeneration torque as the required torque Tr required for the electric motor 6.

The torque limiting unit 43 executes a torque limiting process. The torque limiting process is a process for limiting the torque required for the electric motor 6 so as not to exceed an upper limit value of the discharge current and an upper limit value of the charge current of the battery 3a.

(Control Form and Set Value in Low-Speed Mode)

FIG. 4 is a table showing a correspondence relation of a vehicle state, a user operation, a control form, and a set value in the low-speed mode. Whether the rotation speed control by the low-speed rotation speed control unit 42c is executed or the torque control of the low-speed torque control unit 42d is executed depends on a combination of the vehicle state indicated by the vehicle state information and the user operation indicated by the operation information.

As shown in FIG. 4, in a case where it is determined that a power running control condition is satisfied, the controller

31 executes power running control for causing the electric motor 6 to generate a driving torque for causing the vehicle 1 to travel. The power running control condition is a condition that the vehicle state is the forward traveling state and the user operation is the forward traveling operation, or that the vehicle state is the backward traveling state and the user operation is the backward traveling operation. That is, in a case where it is determined from the vehicle state information and the operation information that the vehicle state is the forward traveling state and the user operation is the forward traveling operation, or in response to determining that the vehicle state is the backward traveling state and the user operation is the backward traveling operation, the controller 31 executes the power running control.

The power running control in the low-speed mode is a control form of the rotation speed control by the low-speed rotation speed control unit 42*c* described above, and the actual rotation speed of the electric motor 6 is brought close to the target rotation speed. The target rotation speed in the power running control increases gradually while the power running control condition is satisfied from a time when it is determined that the power running control condition is satisfied, and is maintained at a predetermined limiting speed (limiting rotation speed) (see also FIG. 6). A limiting speed during low-speed traveling is set to a value sufficiently smaller than a limit speed set in the normal traveling mode. A rate of increase or an upper limit speed of the target rotation speed does not depend on the operation amount of the torque command operator 15*a* by the user as long as the torque command operator 15*a* is at a position beyond the first angle in the first movement direction R1 from the reference position or the torque command operator 15*a* is at a position beyond the second angle in the second movement direction R2 from the reference position. That is, the target rotation speed in the power running control in the low-speed mode is set to basically change in the same manner regardless of whether the operation amount for the torque command operator 15*a* is large or small.

In a case where it is determined that a first regeneration control condition is satisfied, the low-speed control unit 42 executes first regeneration control for causing the electric motor 6 to generate a regeneration torque that is a torque for braking the vehicle 1. The first regeneration control condition is the above-described torque control condition, and the first regeneration control in the low-speed mode is torque control of the above-described low-speed torque control unit 42*d*. That is, the first regeneration control condition is a condition that the vehicle state is the forward traveling state and the user operation is the reference position operation, or that the vehicle state is the backward traveling state and the user operation is the reference position operation. In a case where it is determined from the vehicle state information and the operation information that the vehicle state is the forward traveling state and the user operation is the reference position operation, or in response to determining that the vehicle state is the backward traveling state and the user operation is the reference position operation, the controller 31 executes the first regeneration control.

In a case where it is determined that a second regeneration control condition is satisfied, the low-speed control unit 42 executes second regeneration control for causing the electric motor 6 to generate a regeneration torque that is torque for braking the vehicle 1. The second regeneration control condition is a condition that the vehicle state is the forward traveling state and the user operation is the backward traveling operation, or that the vehicle state is the backward traveling state and the user operation is the forward traveling operation. That is, in a case where it is determined from the vehicle state information and the operation information that the vehicle state is the forward traveling state and the user operation is the backward traveling operation, or in response to determining that the vehicle state is the backward traveling state and the user operation is the forward traveling operation, the controller 31 executes the second regeneration control. The second regeneration control in the low-speed mode is a control form of the rotation speed control of the above-described low-speed rotation speed control unit 42*c*.

The second regeneration control generates a regenerative braking force larger than that of the first regeneration control. A regeneration amount by the second regeneration control (that is, a regeneration power generation amount) is larger than a regeneration amount by the first regeneration control. A regeneration amount obtained by the second regeneration control when the vehicle state is the forward traveling state is different from that obtained by the second regeneration control when the vehicle state is the backward traveling state. The regeneration amount obtained by the second regeneration control when the vehicle state is the forward traveling state is larger than the regeneration amount obtained by the second regeneration control when the vehicle state is the backward traveling state.

Figure 5:
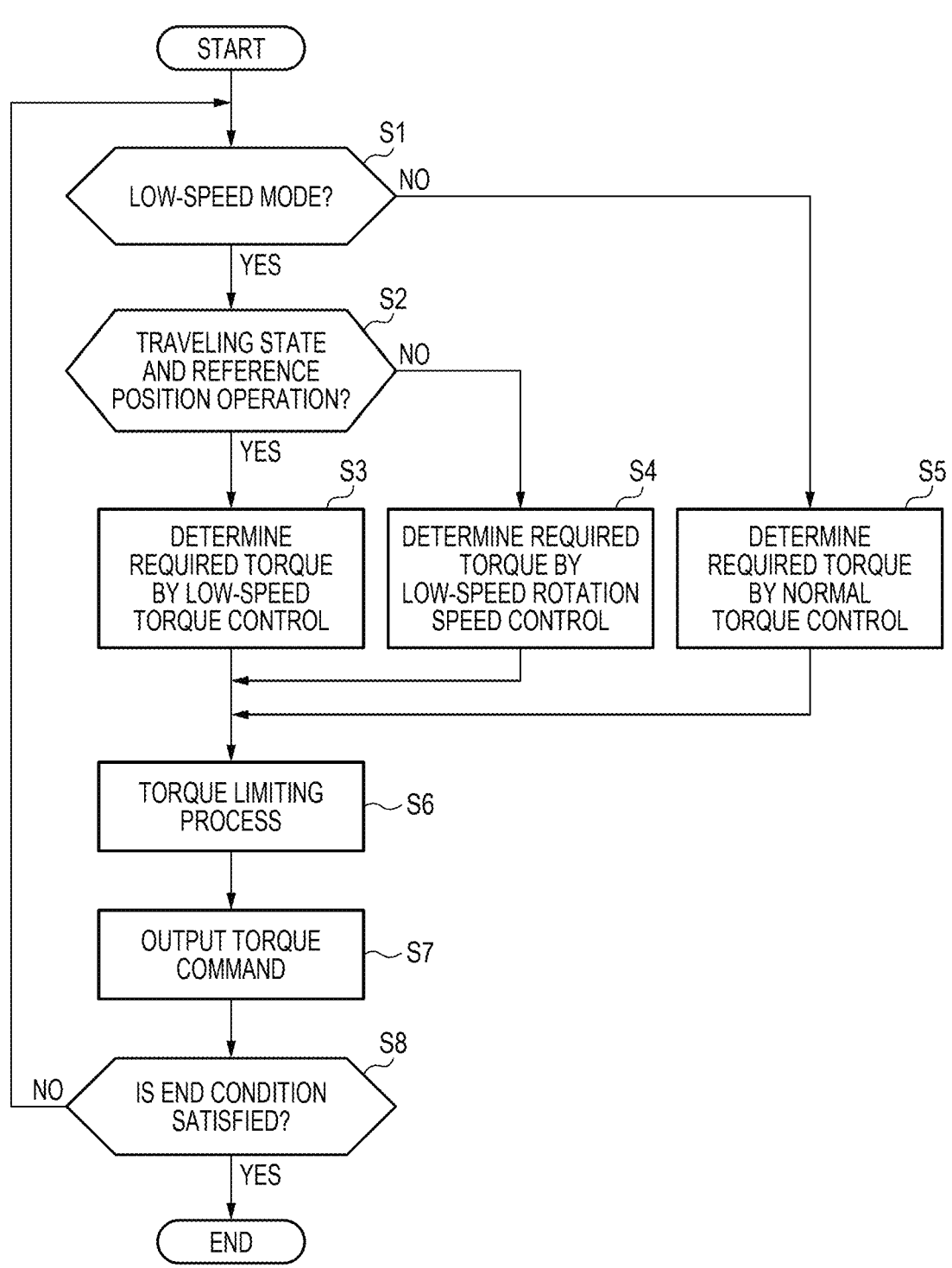
FIG. 5 is a flowchart showing a flow of a torque command output process.

Next, a flow of a torque command output process for outputting a torque command to the electric motor 6 will be described with reference to FIG. 5. In the torque command output process, the controller 31 determines whether the current control mode is the low-speed mode (step S1).

In response to determining that the current control mode is the low-speed mode (step S1: Yes), the controller 31 determines whether the torque control condition is satisfied, in other words, whether a condition that the vehicle is in the traveling state and the user operation is the reference position operation is satisfied (step S2). In response to determining that the torque control condition is satisfied (step S2: Yes), the controller 31 determines the required torque Tr by the low-speed torque control which is the torque control by the low-speed torque control unit 42*d* (step S3).

In response to determining that the torque control condition is not satisfied (step S2: No), the controller 31 determines the required torque Tr by the low-speed rotation speed control which is the rotation speed control by the low-speed rotation speed control unit 42*c* (step S4).

In response to determining in step S1 that the current control mode is not the low-speed mode (step S1: No), the controller 31 determines the required torque Tr by the normal torque control which is the torque control by the normal traveling control unit 41 (step S5).

After determining the required torque Tr in any one of steps S3, S4, and S5, the controller 31 executes the torque limiting process to generate a torque command so that the torque required for the electric motor 6 does not exceed a predetermined upper limit value (step S6), and outputs the generated torque command to the inverter 32 (step S7).

While a predetermined end condition is not satisfied (step S8: No), the controller 31 repeats steps from step S1 to step S7. In response to determining that the predetermined end condition is satisfied (step S8: Yes), the controller 31 terminates the torque command output process.

Figure 6:
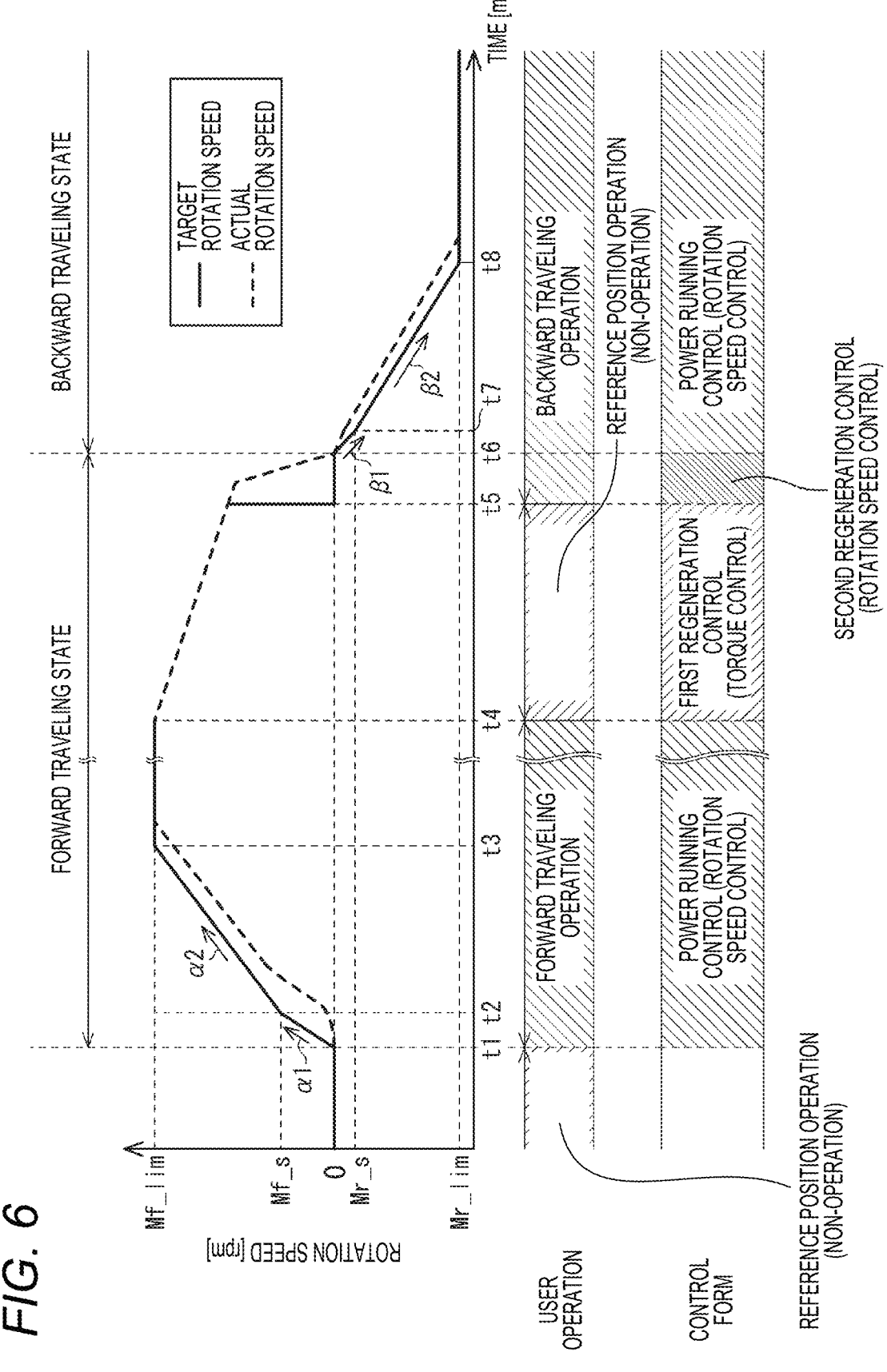
FIG. 6 is a graph showing an example of a temporal change in motor rotation speed in a low-speed mode.

A control form in the low-speed mode will be described in more detail with reference to FIG. 6. FIG. 6 shows temporal changes in the target rotation speed and the actual rotation speed of the electric motor 6 when the user performs the forward traveling operation and then performs the backward traveling operation in a case where the control mode is the low-speed mode. A graph indicated by the solid line in FIG. 6 is the target rotation speed of the electric motor 6, and a graph indicated by the broken line is the actual rotation speed of the electric motor 6. A horizontal axis represents an elapsed time t, and a vertical axis represents a rotation speed.

When the user starts the forward traveling operation in a state in which the control mode is the low-speed mode and the vehicle 1 is stopped (the elapsed time t=t1 in FIG. 6), in other words, when the operation amount for the torque command operator 15a by the user is equal to or larger than a predetermined value, more specifically, when the torque command operator 15a pivots by the first angle or more in the first movement direction R1 from the reference position, the controller 31 selects and executes the power running control, which is a control form of the rotation speed control by the low-speed rotation speed control unit 42c. The power running control in the low-speed mode is rotation speed control for bringing the actual rotation speed of the electric motor 6 close to the target rotation speed, specifically, rotation speed feedback control. In the present embodiment, PID feedback control is used as an example. The controller 31 changes the target rotation speed at a first change rate α as time elapses until the target rotation speed reaches a predetermined first limiting rotation speed Mf_lim. The first change rate α is the rotation acceleration of the rotation speed of the electric motor 6. The first change rate α includes a first start change rate α1 and a first travel change rate α2. An absolute value of the first start change rate α1 is larger than an absolute value of the first travel change rate α2.

The controller 31 changes the target rotation speed as time elapses at the first change rate for starting. The controller 31 determines whether a first change rate switching condition is satisfied while changing the target rotation speed at the first start change rate α1. The first change rate switching condition is a condition that an absolute value of the actual rotation speed of the electric motor 6 exceeds an absolute value of a predetermined threshold value Mf_s. In a case where it is determined that the first change rate switching condition is satisfied (the elapsed time t=t2 in FIG. 6), the controller 31 changes the target rotation speed as time elapses at the first travel change rate α2. When the target rotation speed reaches the first limiting rotation speed Mf_lim (the elapsed time t=t3 in FIG. 6), the controller 31 maintains the target rotation speed at the first limiting rotation speed Mf_lim. For example, the controller 31 increases the required torque Tr as the deviation between the target rotation speed and the actual rotation speed increases. The controller 31 maintains the required torque Tr in a state in which the deviation between the target rotation speed and the actual rotation speed is zero.

In this manner, whether to execute the power running control of the low-speed mode is selected depending on whether the operation amount for the torque command operator 15a is equal to or larger than the predetermined value. As long as the operation amount for the torque command operator 15a is equal to or larger than the predetermined value, a change rate of the target rotation speed is set to a constant change rate α (an increase rate) regardless of a magnitude of the operation amount. The first limiting rotation speed Mf_lim is set to a value corresponding to a low-speed traveling speed of the vehicle. The low-speed traveling speed is set to a value extremely smaller than a maximum forward traveling speed of the vehicle that can occur in the normal traveling mode, for example, 10 km/h or less. In the present embodiment, a speed of the vehicle corresponding to the first limiting rotation speed Mf_lim is about 5 km/h in the forward traveling direction on a flat traveling road.

Thereafter, when the user executes a reference position operation to return the torque command operator 15a to the reference position (the elapsed time t=t4 in FIG. 6), in other words, when the operation amount by the user is equal to or less than a predetermined value, more specifically, when the torque command operator 15a pivots from the reference position to a position that is less than the first angle in the first movement direction R1 and pivots from the reference position is to a position that is less than the second angle in the second movement direction R2, the controller 31 selects and executes the first regeneration control which is the torque control by the low-speed torque control unit 42d. In this case, in the low-speed mode, the controller 31 refers to correspondence relation information to be described later stored in the memory to execute regeneration torque control for controlling the electric motor 6 to generate a regeneration torque corresponding to the received motor rotation speed. The vehicle 1 is decelerated by the regenerative braking force by the first regeneration control, and the actual rotation speed of the electric motor 6 decreases. During a period between time t4 and time t5 in FIG. 6, since the torque control is executed instead of the rotation speed control, the target rotation speed indicated by the solid line is not shown, and only the actual rotation speed indicated by the broken line is shown.

Thereafter, when the user executes a backward traveling operation during deceleration (the elapsed time t=t5 in FIG. 6), the controller 31 selects the rotation speed control by the low-speed rotation speed control unit 43c, and shifts from the first regeneration control to the second regeneration control. In the second regeneration control, the controller 31 sets the target rotation speed to zero and executes feedback control on the electric motor 6 so that the rotation speed of the electric motor 6 is zero. During a period until the actual rotation speed is reduced to zero (from time t5 to time t6 in FIG. 6), a regenerative braking force larger than that of the first regeneration control acts.

When the actual rotation speed reaches zero during the backward traveling operation (the elapsed time t=t6 in FIG. 6), the selection of the rotation speed control by the low-speed rotation speed control unit 43c is continued, and the second regeneration control is shifted to the power running control for causing the electric motor 6 to generate a driving torque in the negative direction. The power running control in the low-speed mode is rotation speed control for bringing the actual rotation speed of the electric motor 6 close to the target rotation speed. The controller 31 changes the target rotation speed at a second change rate β as time elapses until the target rotation speed reaches a predetermined second limiting rotation speed Mr_lim. The second change rate β is the rotation acceleration of the rotation speed of the electric motor 6. The second change rate includes a second start change rate β1 and a second travel change rate β2. An absolute value of the second start change rate β1 is larger than an absolute value of the second travel change rate β2.

The controller 31 changes the target rotation speed at the second start change rate β1 as time elapses. The controller 31 determines whether a second change rate switching condition is satisfied while changing the target rotation speed at the second start change rate β1. The second change rate switching condition is a condition that an absolute value of the actual rotation speed of the motor exceeds an absolute value of a predetermined threshold value Mr_s. In a case where it is determined that the second change rate switching condition is satisfied (the elapsed time t=t7 in FIG. 6), the controller 31 changes the target rotation speed at the second travel change rate β2 as time elapses. When the target rotation speed reaches the second limiting rotation speed Mr_lim (the elapsed time t=t8 in FIG. 6), the controller 31 maintains the target rotation speed at the second limiting rotation speed Mr_lim. The second limiting rotation speed Mr_lim is set to a value corresponding to the low-speed traveling speed of the vehicle. The low-speed traveling speed is set to a value extremely smaller than a maximum forward traveling speed of the vehicle that can occur in the normal traveling mode, for example, 10 km/h or less. In the present embodiment, a speed of the vehicle corresponding to the second limiting rotation speed Mr_lim is about 3 km/h in the backward traveling direction on a flat traveling road.

Thus, even when the vehicle state is the forward traveling state or the backward traveling state, the power running control, the first regeneration control, and the second regeneration control may be executed according to the user operation. However, as shown in FIG. 4, in the present embodiment, even in the same control form, absolute values of set values used for the various controls may differ depending on whether the vehicle state is the forward traveling state or the backward traveling state. For example, the absolute values of the set values of the following parameters (i) to (vii) are different between the rotation speed control executed in the forward traveling state and the rotation speed control executed in the backward traveling state.

(i) Absolute value of a change rate of a target rotation speed (the first change rate $\alpha$, the second change rate $\beta$)

(ii) Absolute value of a maximum target rotation speed (Mf_lim, Mr_lim)

(iii) Absolute value of a threshold value of a change rate switching condition of a target rotation speed (Mf_s, Mr_s)

(iv) Absolute value of a deviation limiting value (Df, Dr)

(v) Absolute value of a threshold value of a high-speed process switching condition (vi) Absolute value of an offset torque (vii) Absolute values of upper limiting torque and lower limiting torque (i) The absolute value of the change rate of the target rotation speed (the first change rate $\alpha$, the second change rate $\beta$) will be described. In the power running control when the vehicle 1 is in the forward traveling state, the target rotation speed is changed at the first change rate $\alpha$ as time elapses, and in the power running control when the vehicle 1 is in the backward traveling state, the target rotation speed is changed at the second change rate $\beta$ as time elapses. An absolute value of the first change rate $\alpha$ is larger than an absolute value of the second change rate $\beta$. For example, the absolute value of the first start change rate $\alpha 1$ is larger than the absolute value of the second start change rate $\beta 1$. For example, the absolute value of the first travel change rate $\alpha 2$ is larger than the absolute value of the second travel change rate $\beta 2$.

(ii) The absolute value (Mf_lim, Mr_lim) of the maximum target rotation speed will be described. In the power running control when the vehicle 1 is in the forward traveling state, the maximum target rotation speed is limited to the first limiting rotation speed Mf_lim, and in the power running control when the vehicle 1 is in the backward traveling state, the maximum target rotation speed is limited to the second limiting rotation speed Mr_lim. An absolute value of the first limiting rotation speed Mf_lim is larger than an absolute value of the second limiting rotation speed Mr_lim. For example, the first limiting rotation speed Mf_lim is a rotation speed set such that the vehicle speed is 5 km/h in the forward traveling direction, and the second limiting rotation speed Mr_lim is a rotation speed set such that the vehicle speed is 3 km/h in the backward traveling direction. That is, in the low-speed mode of the present embodiment, an absolute value of the maximum traveling speed is larger in the forward traveling than in the backward traveling. As described above, in the present embodiment, a speed of the vehicle corresponding to the first limiting rotation speed Mf_lim is about 5 km/h on a flat traveling road, and a speed of the vehicle corresponding to the second limiting rotation speed Mr_lim is about 3 km/h on a flat traveling road.

(iii) The absolute value of the threshold value of the change rate switching condition of the target rotation speed (Mf_s, Mr_s) will be described. In the power running control when the vehicle 1 is in the forward traveling state, when the absolute value of the actual rotation speed of the motor exceeds the absolute value of the threshold value Mf_s, a first change rate of the target rotation speed is switched from the first start change rate $\alpha 1$ to the first travel change rate $\alpha 2$. In the power running control when the vehicle 1 is in the backward traveling state, when the absolute value of the actual rotation speed of the motor exceeds the absolute value of the threshold value Mr_s, a second change rate of the target rotation speed is switched from the second start change rate $\beta 1$ to the second travel change rate $\beta 2$. The absolute value of the threshold value Mf_s at the time of forward traveling is larger than the absolute value of the threshold value Mr_s at the time of backward traveling.

Details of the parameters (iv), (v), (vi), and (vii) will be described later.

(Low-Speed Rotation Speed Control)

Figure 7:
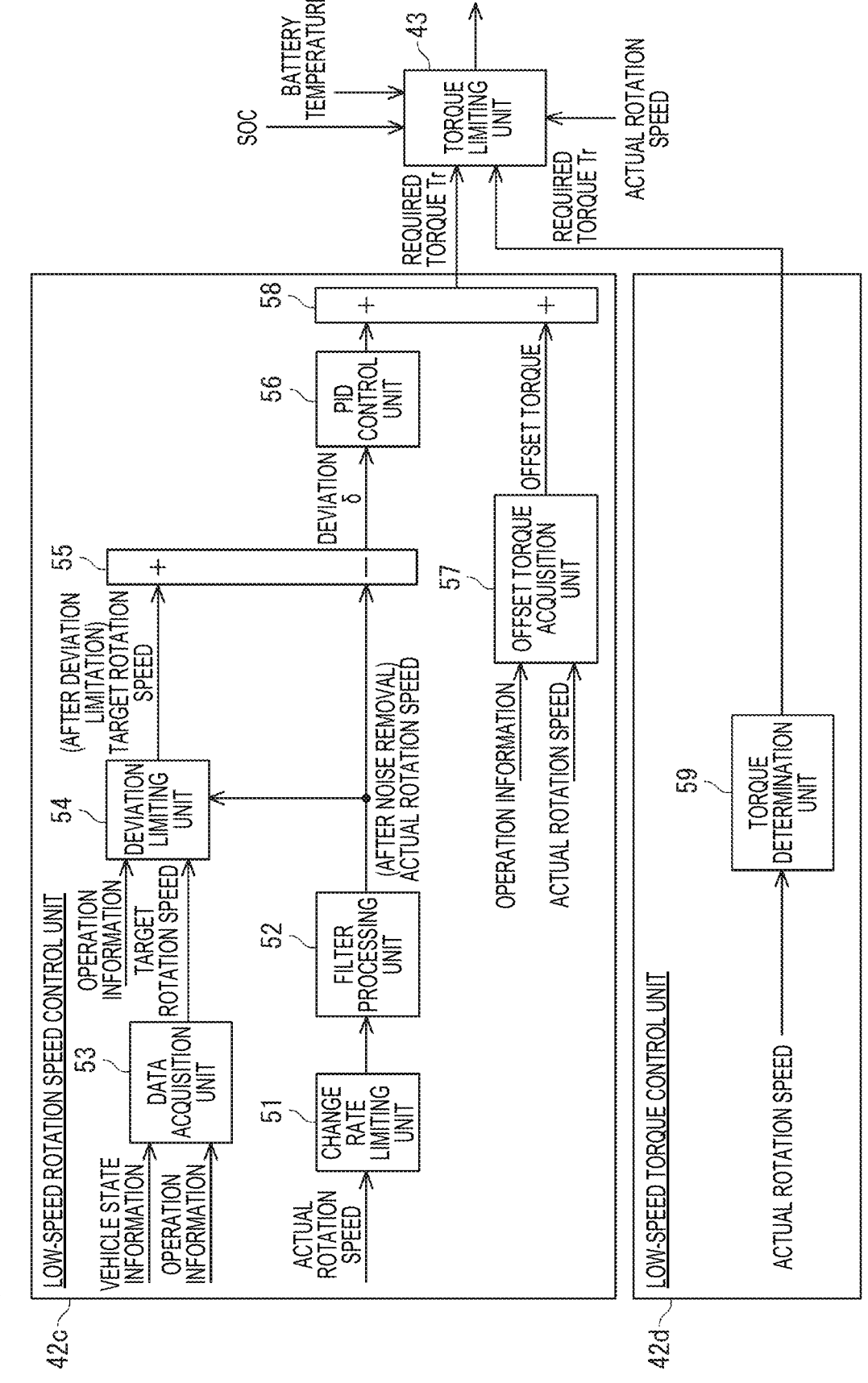
FIG. 7 is a block diagram of a low-speed rotation speed control unit in FIG. 3.

A rotation speed control process executed by the low-speed rotation speed control unit 42c will be described with reference to FIGS. 7 to 10. As shown in FIG. 7, the low-speed rotation speed control unit 42c includes a change rate limiting unit 51, a filter processing unit 52, a data acquisition unit 53, a deviation limiting unit 54, a deviation acquisition unit 55, a PID control unit 56, an offset torque acquisition unit 57, and an addition unit 58.

The change rate limiting unit 51 and the filter processing unit 52 remove noise from a motor rotation speed detected by the rotation speed sensor 22. Specifically, the change rate limiting unit 51 executes a change rate limiting filter process on the motor rotation speed detected by the rotation speed sensor 22. The change rate limiting filter process is a process for limiting a time change rate within a predetermined range with respect to the time-series data of the actual rotation speed of the electric motor 6. The filter processing unit 52 executes a low-pass filter process (a high-frequency component removal process) on data subjected to the change rate limiting filter process executed by the change rate limiting unit 51.

FIG. 8 is a graph illustrating noise removal from an actual rotation speed performed by the change rate limiting unit 51 and the filter processing unit 52 in FIG. 7. The graph indicated by a solid line in FIG. 8 illustrates raw data of the rotation speed sensor 22, and illustrates a temporal change in the actual rotation speed of the electric motor 6 detected by the rotation speed sensor 22. In this example, the actual rotation speed gradually increases and is then maintained at a certain rotation speed. A steep change occurs in the actual rotation speed at a certain time. Such a steep change in the actual rotation speed leads to a steep change in the required torque Tr as an output of the low-speed rotation speed control unit 42c, and is preferably removed before the PID control is executed.

A graph indicated by a broken line in FIG. 8 illustrates a result obtained by executing only the low-pass filter process on the actual rotation speed data detected by the rotation speed sensor 22. When the graph indicated by the broken line is compared with the graph indicated by the solid line, the low-pass filter process is executed to smooth the graph indicated by the solid line to obtain data from which noise is removed. However, when the data is processed only by the low-pass filter process, the time delay of the processed data becomes large with respect to sensor data illustrated in the graph indicated by the solid line.

A graph indicated by a one-dot chain line in FIG. 8 illustrates a result obtained by executing the change rate limiting filter process and the low-pass filter process on the actual rotation speed data detected by the rotation speed sensor 22. The actual rotation speed data detected by the rotation speed sensor 22 is first subjected to the change rate limiting filter process to reduce the amplitude of noise, and is further smoothed by the low-pass filter process. Since the amplitude of the noise is reduced, it is possible to prevent the filter process from being excessive as compared with the case of processing only by the low-pass filter process. As a result, it is possible to prevent an increase in time delay with respect to the sensor data.

Returning to FIG. 7, the data acquisition unit 53 acquires target rotation speed data. The target rotation speed data is data related to how the target rotation speed is changed as time elapses. For example, the target rotation speed data is data for changing the target rotation speed as time elapses to the limiting rotation speeds Mf_lim and Mr_lim at preset change rates α, β, and changing the target rotation speed so as to maintain the target rotation speed at the limiting rotation speeds Mf_lim and Mr_lim when the target rotation speed reaches the limiting rotation speeds Mf_lim and Mr_lim. The target rotation speed data includes information related to the set values of the parameters (i), (ii), and (iii) described above. The memory of the controller 31 stores a plurality of pieces of target rotation speed data, and the data acquisition unit 53 selects and acquires one piece of target rotation speed data from the plurality of pieces of target rotation speed data based on the vehicle state information and the operation information.

The deviation limiting unit 54 executes a deviation limiting process for limiting an increase in an absolute value of the target rotation speed according to the actual rotation speed. The deviation limiting process is a process for preventing a deviation δ between the target rotation speed and the actual rotation speed of the electric motor 6 from becoming too large. The deviation limiting unit 54 acquires the target rotation speed from the data acquisition unit 53, and acquires the actual rotation speed from which noise is removed by the change rate limiting unit 51 and the filter processing unit 52. The deviation limiting unit 54 limits a change in the target rotation speed so that a deviation obtained by subtracting the acquired actual rotation speed from the acquired target rotation speed does not exceed a predetermined deviation limiting value.

FIG. 9 is a graph illustrating the deviation limiting process performed by the deviation limiting unit 54 in FIG. 7. In FIG. 9, a horizontal axis represents time, and a vertical axis represents the rotation speed. A graph indicated by a solid line in FIG. 9 illustrates a temporal change in the target rotation speed when the deviation limiting process is executed, and a graph indicated by a broken line illustrates a temporal change in the target rotation speed when the deviation limiting process is executed. For comparison, FIG. 9 also illustrates a target rotation speed and an actual rotation speed when the deviation limiting process is not executed. A graph indicated by a one-dot chain line in FIG. 9 illustrates a temporal change in the target rotation speed when the deviation limiting process is not executed, and a graph indicated by a two-dot chain line illustrates a temporal change in the target rotation speed when the deviation limiting process is not executed.

When the deviation limiting process is not executed, as in the graph indicated by the one-dot chain line in FIG. 9, in the power running control when the vehicle 1 in the low-speed mode is in the forward traveling state, the target rotation speed changes at the first change rate α as time elapses until the target rotation speed reaches the first limiting rotation speed Mf_lim. In this situation, when the user operates the brake lever 19 to apply a mechanical brake to the vehicle 1, the actual rotation speed does not follow the target rotation speed and remains zero as in the graph indicated by the two-dot chain line in FIG. 9. Therefore, a deviation between the target rotation speed and the actual rotation speed increases. When the user releases a brake operation after the target rotation speed reaches the first limiting rotation speed Mf_lim, since the deviation between the actual rotation speed and the target rotation speed is large, the required torque Tr calculated from the deviation becomes excessive, and the actual rotation speed rapidly increases to greatly overshoot the first limiting rotation speed Mf_lim.

When the deviation limiting process is executed, a change in target rotation speed is limited such that the deviation δ between the target rotation speed and the actual rotation speed does not exceed a first deviation limiting value Df. That is, as in the graph indicated by the solid line in FIG. 9, the deviation δ between the target rotation speed and the actual rotation speed increases, and when the deviation reaches the predetermined first deviation limiting value Df, the target rotation speed is maintained at the first deviation limiting value Df. When the user releases the brake operation in a state in which the target rotation speed is maintained at the first deviation limiting value Df, the required torque Tr is calculated from the first deviation limiting value Df. As indicated by the broken line in FIG. 9, since the deviation δ between the target rotation speed and the actual rotation speed is limited to the first deviation limiting value Df, it is possible to prevent the actual rotation speed from greatly overshooting the first limiting rotation speed Mf_lim.

Although FIG. 9 illustrates the deviation limiting process of the rotation speed control executed in the forward traveling state, the deviation limiting process is also executed in the rotation speed control executed in the backward traveling state. However, as described in (iv), the absolute value of the deviation limiting value is different between the deviation limiting process in the forward traveling state and the deviation limiting process in the backward traveling state. In the deviation limiting process when the vehicle 1 is in the forward traveling state, the deviation between the target rotation speed and the actual rotation speed is limited to the first deviation limiting value Df, and in the deviation limiting process when the vehicle 1 is in the backward traveling state, the deviation between the target rotation speed and the actual rotation speed is limited to a second deviation limiting value Dr. An absolute value of the first deviation limiting value Df at the time of forward traveling is larger than an absolute value of the second deviation limiting value Dr at the time of backward traveling.

Returning to FIG. 7, the deviation acquisition unit 55 acquires a target rotation speed whose deviation is limited by the deviation limiting unit 54, and acquires the actual rotation speed from which noise is removed by the change rate limiting unit 51 and the filter processing unit 52. The deviation limiting unit 54 subtracts the acquired actual rotation speed from the acquired target rotation speed to acquire a deviation between the target rotation speed and the actual rotation speed.

The PID control unit 56 executes a proportional-integral-differential (PID) process on the deviation δ obtained by the deviation acquisition unit 55. Specifically, the PID control unit 56 calculates a PID control torque by adding a value obtained by multiplying the deviation δ by a proportional gain, a value obtained by multiplying a value obtained by integrating the deviation δ by an integral gain, and a value obtained by multiplying a value obtained by differentiating the deviation δ by a differential gain. A value obtained by adding an offset torque obtained by the offset torque acquisition unit 57 to the PID control torque by the addition unit 58 is determined as the required torque Tr.

The PID control unit 56 executes a process for rapidly reducing the absolute value of the actual rotation speed when the absolute value of the actual rotation speed overshoots the absolute value of the target rotation speed. Specifically, when a value obtained by subtracting the absolute value of the target rotation speed from the absolute value of the actual rotation speed is less than a threshold value, the PID control unit 56 executes a normal PID process (which may also be referred to as normal rotation speed control), and in a case where it is determined that the high-speed process switching condition is satisfied, the PID control unit 56 switches from the normal PID process to a high-speed PID process (which may also be referred to as high-speed rotation speed control) for rapidly reducing the absolute value of the actual rotation speed as compared with a case where the normal PID process is executed. The high-speed process switching condition is a condition that the absolute value of the actual rotation speed exceeds the absolute value of the target rotation speed with a difference equal to or larger than a threshold value.

In the present embodiment, the high-speed PID process is a process for clearing an integral value obtained by integrating the deviation δ. However, the high-speed PID process is not limited to the deletion of the integral value, and may be any process as long as the absolute value of the actual rotation speed is rapidly reduced as compared with the case where the normal PID process is executed. For example, in the high-speed PID process, the proportional gain may be increased or the integral gain may be reduced as compared with the normal PID process. In the high-speed PID process, the value obtained by multiplying the deviation δ by the proportional gain, the value obtained by multiplying the value obtained by integrating the deviation δ by the integral gain, and the value obtained by multiplying the value obtained by differentiating the deviation δ by the differential gain may be reduced by a predetermined torque to obtain a PID control torque.

As described above, when a condition that the absolute value of the actual rotation speed exceeds the absolute value of the target rotation speed with a difference equal to or larger than a threshold value, which is a high-speed process condition, is satisfied, the normal PID process is switched to the high-speed PID control, but the absolute value of the threshold value of the high-speed process switching condition is different between when the vehicle 1 is in the forward traveling state and when the vehicle 1 is in the backward traveling state, as in (v) described above. An absolute value of a first threshold value of the high-speed process switching condition in the power running control at the time of the forward traveling of the vehicle 1 is larger than an absolute value of a second threshold value of the high-speed process switching condition in the power running control at the time of the backward traveling of the vehicle 1.

The offset torque acquisition unit 57 acquires the offset torque. The offset torque is a torque that is added to the PID control torque in order to improve the traveling responsiveness of the vehicle 1 when the motor rotation speed is a low rotation speed, such as when the vehicle 1 starts. The offset torque is obtained with reference to an offset torque map stored in advance in the memory. The offset torque map shows a correspondence relation between the motor rotation speed and the torque.

Figure 10:
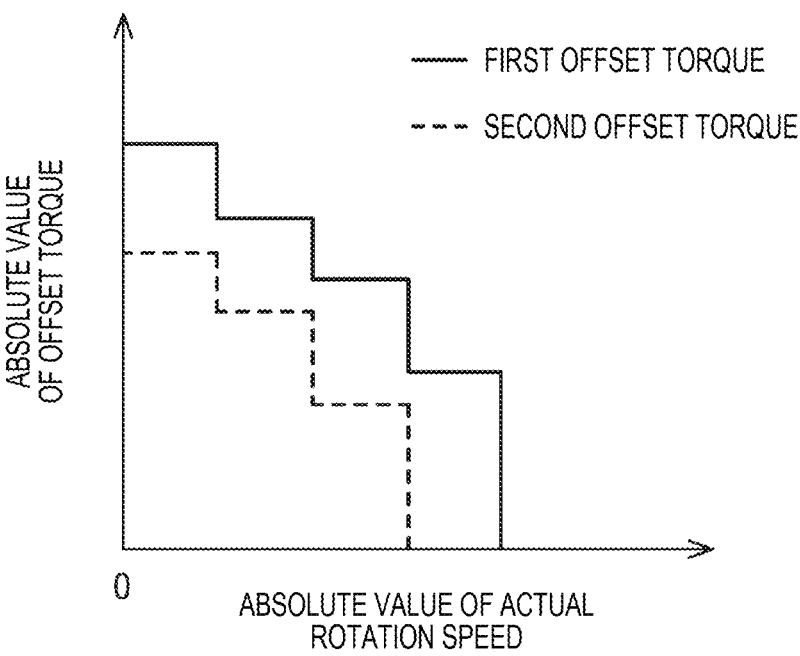
FIG. 10 is an example of an offset torque map.

FIG. 10 is an example of the offset torque map. In FIG. 10, a horizontal axis represents an absolute value of the actual rotation speed of the electric motor 6, and a vertical axis represents an absolute value of the offset torque. A graph indicated by the solid line in FIG. 10 shows a first offset torque map used in the rotation speed control when the vehicle 1 is in the forward traveling state, and a graph indicated by the broken line in FIG. 10 shows a second offset torque map used in the rotation speed control when the vehicle 1 is in the backward traveling state.

In both the first offset torque map and the second offset torque map, the absolute value of the torque gradually increases as the absolute value of the actual rotation speed decreases. The offset torque corresponding to the motor rotation speed of a certain value or more is zero.

As in (vi) described above, the offset torque is different between the rotation speed control executed in the forward traveling state and the rotation speed control executed in the backward traveling state. That is, the first offset torque map and the second offset torque map have different values of the offset torque with respect to the absolute value of the actual rotation speed. An absolute value of a first offset torque obtained with reference to the first offset torque map when the vehicle 1 is in the forward traveling state is larger than an absolute value of a second offset torque obtained with reference to the second offset torque map when the vehicle 1 is in the backward traveling state.

Returning to FIG. 7, the required torque Tr obtained by adding the offset torque to the PID control torque by the addition unit 58 is sent to the torque limiting unit 43.
(Low-Speed Torque Control)

Next, a torque control process executed by the low-speed torque control unit 42d will be described. As shown in FIG. 7, the low-speed torque control unit 42d includes a torque determination unit 59. The torque determination unit 59 obtains a regeneration torque corresponding to the motor rotation speed detected by the rotation speed sensor 22. Specifically, the memory of the controller 31 stores correspondence relation information indicating a correspondence relation between the motor rotation speed and the torque. The correspondence relation information may be, for example, a torque map or an arithmetic expression. The correspondence relation information may be information indicating a correspondence relation between the motor rotation speed and the torque (that is, the regeneration torque) at least. For example, the correspondence relation information may indicate a correspondence relation between the accelerator operation amount, the motor rotation speed, and the torque. The low-speed torque control unit 42d and the normal traveling control unit 41 may refer to the same correspondence relation information (for example, a torque map) or may refer to different correspondence relation information. The torque determination unit 59 refers to the correspondence relation information, acquires a regeneration torque corresponding to the motor rotation speed indicated by the received motor rotation speed information, and determines the torque as the required torque Tr required for the electric motor 6. The required torque Tr determined by the torque determination unit 59 is sent to the torque limiting unit 43.

(Torque Limiting Process)

Figure 11:
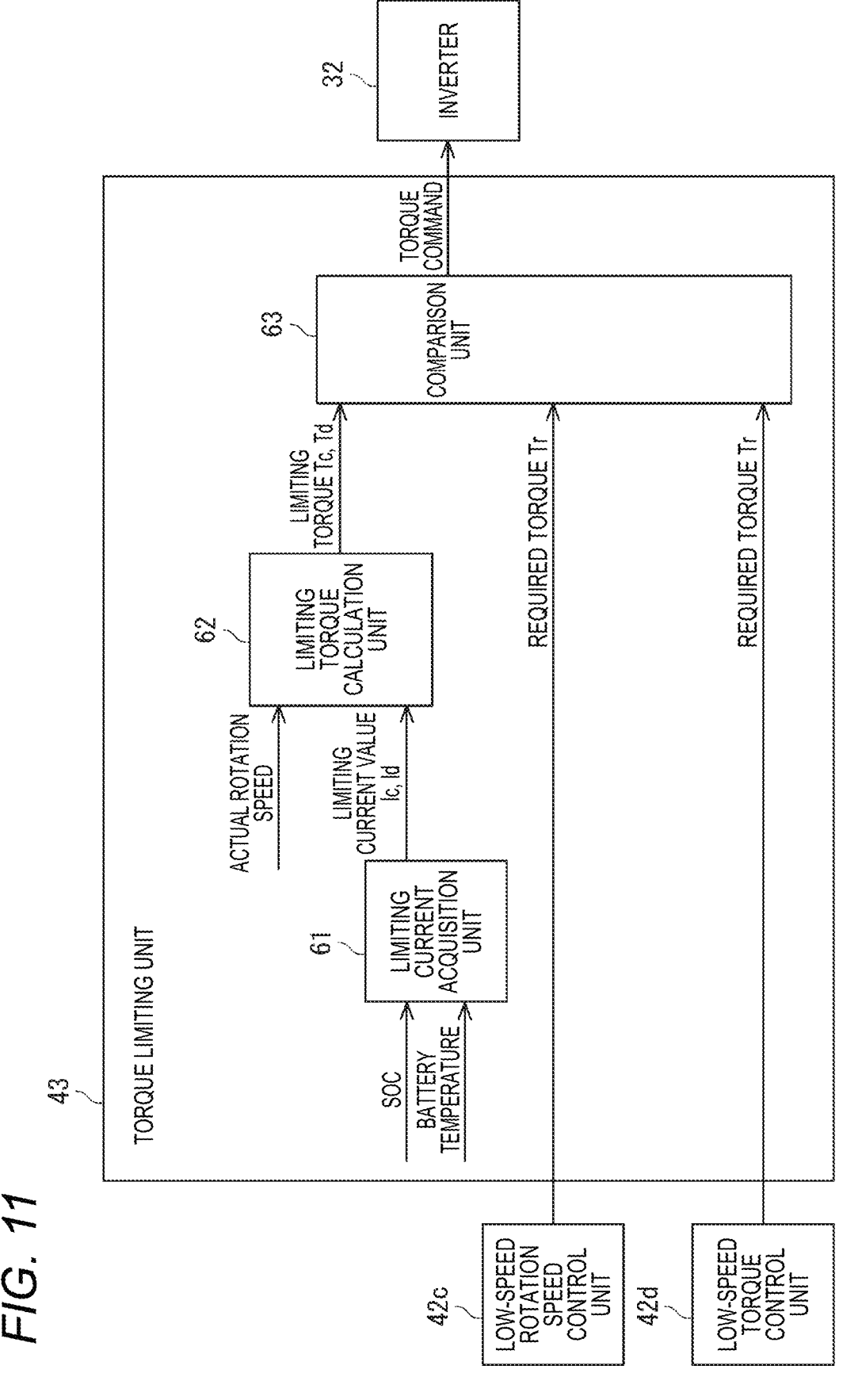
FIG. 11 is a block diagram of a torque limiting unit in FIG. 3.

The torque limiting process performed by the torque limiting unit 43 will be described with reference to FIG. 11. FIG. 11 is a block diagram of the torque limiting unit 43 in FIG. 3. The torque limiting unit 43 includes a limiting current acquisition unit 61, a limiting torque calculation unit 62, and a comparison unit 63.

The limiting current acquisition unit 61 determines a limited current based on the battery temperature information received from the temperature sensor 3b and the SOC information received from the battery management unit 3c. The memory of the controller 31 stores correspondence relation information indicating a correspondence relation between a battery temperature and the SOC and a correspondence relation between a charge current limiting value Ic and a discharge current limiting value Id. The limiting current acquisition unit 61 refers to the correspondence relation information to acquire the charge current limiting value Ic and the discharge current limiting value Id corresponding to the received battery temperature and SOC. The charge current limiting value Ic is a maximum allowable charge current set in the received battery temperature and SOC, and the discharge current limiting value Id is a maximum allowable discharge current set in the received battery temperature and SOC.

The limiting torque calculation unit 62 calculates a charge limiting torque Tc from the charge current limiting value Ic acquired by the limiting current acquisition unit 61. Specifically, the limiting torque calculation unit 62 calculates a charge limiting power by multiplying the charge current limiting value Ic by a voltage of the battery 3a, and divides the calculated charge limiting power by the actual rotation speed of the electric motor 6 to obtain the charge limiting torque Tc. By setting the regeneration torque generated in the electric motor 6 during the regeneration control to be equal to or less than the charge limiting torque Tc, a charge current to the battery 3a is kept equal to or less than the charge current limiting value Ic. The charge limiting torque Tc may also be referred to as a regeneration limiting torque Tc. That is, the regeneration limiting torque Tc is a torque when a current flowing into the battery 3a becomes the maximum allowable charge current.

The limiting torque calculation unit 62 calculates a discharge limiting torque Td from the discharge current limiting value Id acquired by the limiting current acquisition unit 61. Specifically, the limiting torque calculation unit 62 calculates a discharge limiting power by multiplying the discharge current limiting value Id by the voltage of the battery 3a, and divides the calculated discharge limiting power by the actual rotation speed of the electric motor 6 to obtain the discharge limiting torque Td. By setting the driving torque generated in the electric motor 6 during the power running control to be equal to or less than the discharge limiting torque Td, a discharge current from the battery 3a is kept equal to or less than the discharge current limiting value Id. The discharge limiting torque Td may also be referred to as a power running limiting torque Td. That is, the power running limiting torque Td is a torque when a current flowing out from the battery 3a becomes the maximum allowable discharge current.

In this way, the power running limiting torque Td and the regeneration limiting torque Tc are changed based on the battery state information related to a state of the battery 3a, that is, the battery temperature information and the SOC information. For example, the power running limiting torque Td and the regeneration limiting torque Tc may be set to decrease as the temperature of the battery 3a increases. For example, the regeneration limiting torque Tc is set to decrease as the SOC approaches 100%. This is to avoid overcharge of the battery 3a. In the present embodiment, under conditions of the same SOC and the same battery temperature, the power running limiting torque Td is larger than the regeneration limiting torque Tc.

The comparison unit 63 compares the required torque Tr determined by the low-speed rotation speed control unit 42c or the low-speed torque control unit 42d with the limiting torque calculated by the limiting torque calculation unit 62. That is, the comparison unit 63 compares the required torque Tr with the power running limiting torque Td during the power running control, and compares the required torque Tr with the regeneration limiting torque Tc during the first regeneration control or during the second regeneration control. In a case where it is determined that an absolute value of the required torque Tr does not exceed an absolute value of the limiting torque, the comparison unit 63 outputs a control command to the inverter 32 so that the electric motor 6 generates the required torque Tr. In a case where it is determined that the absolute value of the required torque Tr exceeds the absolute value of the limiting torque, the comparison unit 63 outputs a control command to the inverter 32 so that the electric motor 6 generates the limiting torque.

The comparison unit 63 limits a torque in the positive direction or the negative direction required for the electric motor 6 during the power running control to the power running limiting torque Td or less. The comparison unit 63 limits a torque in the positive direction or the negative direction required for the electric motor 6 during the regeneration control to the regeneration limiting torque Tc or less. Therefore, as in (vii) described above, an absolute value of an upper limiting torque, which is a limiting torque of the electric motor 6 in the positive direction, and an absolute value of a lower limiting torque, which is a limiting torque of the electric motor 6 in the negative direction, are different between the rotation speed control executed in the forward traveling state and the rotation speed control executed in the backward traveling state.

Specifically, the comparison unit 63 acquires the power running limiting torque Td and the regeneration limiting torque Tc calculated by the limiting torque calculation unit 62. In a case where it is determined that the vehicle state is the forward traveling state, the comparison unit 63 sets the acquired power running limiting torque Td as the upper limiting torque and sets the acquired regeneration limiting torque Tc as the lower limiting torque. That is, when the vehicle state is the forward traveling state, the comparison unit 63 limits a magnitude of the driving torque generated by the electric motor 6 in the positive direction so as not to exceed the power running limiting torque Td, and limits a magnitude of the regeneration torque generated by the electric motor 6 in the negative direction so as not to exceed the regeneration limiting torque Tc.

On the other hand, in a case where it is determined that the vehicle state is the backward traveling state, the comparison unit 63 sets the acquired regeneration limiting torque Tc as the upper limiting torque and sets the acquired power running limiting torque Td as the lower limiting torque. That is, when the vehicle state is the backward traveling state, the comparison unit 63 limits the magnitude of the regeneration torque generated by the electric motor 6 in the positive direction so as not to exceed the regeneration limiting torque Tc, and limits the magnitude of the driving torque generated by the electric motor 6 in the negative direction so as not to exceed the power running limiting torque Td.

However, in the present embodiment, as an exception, the comparison unit 63 determines whether the vehicle state is a predetermined slow-speed traveling state, and in a case where it is determined that the vehicle state is the slow-speed traveling state, the comparison unit 63 executes a torque limiting reduction process for reducing a limit on the required regeneration torque Tr as compared with a case where it is determined that the vehicle state is not the slow-speed traveling state. In other words, the comparison unit 63 sets the regeneration limiting torque Tc set in a case where it is determined that the vehicle state is the slow-speed traveling state to be larger than the regeneration limiting torque Tc calculated by the limiting torque calculation unit 62 in a case where it is determined that the vehicle state is not the slow-speed traveling state.

For example, the slow-speed traveling state is a state in which a regeneration amount in the electric motor 6 is a predetermined value or less. The slow-speed traveling state may be, for example, a state in which the absolute value of the motor rotation speed is a predetermined value or less. The slow-speed traveling state includes a stop state of the vehicle 1 in which the absolute value of the motor rotation speed is zero.

In the present embodiment, a reason why the limit on the required regeneration torque Tr is reduced when the vehicle state is the slow-speed traveling state will be described. For example, when the battery 3a is fully charged, in order to prevent overcharge, the regeneration limiting torque Tc calculated by the limiting torque calculation unit 62 is zero or substantially zero. It is assumed that the battery 3a is temporarily fully charged and the vehicle 1 is traveling forward at a slow speed (for example, a vehicle speed of 1 km or less). It is assumed that the user executes a backward traveling operation in this state. In this case, since the vehicle 1 is in the forward traveling state, the limiting torque of the electric motor 6 in the negative direction is zero or substantially zero of the regeneration limiting torque. Therefore, although the user performs the backward traveling operation, no torque is generated in the negative direction of the electric motor 6. On the other hand, when the vehicle 1 is at an extremely low speed, since the regeneration amount is substantially zero, in a state in which the vehicle 1 is traveling at a low speed at which the regeneration torque is not generated, the battery is not overcharged even if the regeneration torque of the electric motor 6 is not limited. This is the reason why the limit on the required regeneration torque Tr is reduced when the vehicle state is the slow-speed traveling state.

Specifically, the comparison unit 63 determines whether the vehicle state is the slow-speed traveling state based on the rotation speed detected by the rotation speed sensor 22. In response to determining that the vehicle 1 is in the slow-speed traveling state, the comparison unit 63 sets a magnitude of the regeneration limiting torque Tc to the same magnitude as the power running limiting torque Td calculated by the limiting torque calculation unit 62 instead of the regeneration limiting torque Tc calculated by the limiting torque calculation unit 62 based on the SOC and the battery temperature. In other words, both the upper limiting torque and the lower limiting torque are set to the power running limiting torque Td. Accordingly, the limit on the regeneration torque is reduced. This is because, even when the battery 3a is fully charged, the power running limiting torque Td is not zero or substantially zero as in the regeneration limiting torque Tc, and is a relatively large value.

However, in a process for reducing a limit on a regeneration torque, instead of setting the magnitude of the regeneration limiting torque Tc to the same magnitude as the power running limiting torque Td calculated by the limiting torque calculation unit 62, the regeneration limiting torque Tc may not be set or may be larger by a predetermined torque than the regeneration limiting torque Tc calculated by the limiting torque calculation unit 62.

(Operation and Effect)

As described above, according to the present embodiment, the controller 31 is configured to switch between the power running control and the regeneration control based on the vehicle state information and the operation information. Therefore, it is possible to realize travel control suitable for each of the forward/backward traveling state of the vehicle and each state of the user operation. Accordingly, the feeling felt by the user when the vehicle is operated to travel can be brought close to the feeling intended by the user.

According to the present embodiment, in a case where it is determined that the vehicle state is the forward traveling state and the user operation is the backward traveling operation, or in a case where it is determined that the vehicle state is the backward traveling state and the user operation is the forward traveling operation, the controller 31 executes the second regeneration control for generating a regenerative braking force larger than that in the first regeneration control in the case where it is determined that the user operation is the reference position operation. Therefore, it is easy to realize regeneration that reflects the intention of the user.

According to the present embodiment, the controller 31 executes the rotation speed control so that the rotation speed of the electric motor 6 is zero in the second regeneration control. Therefore, it is easy to realize regeneration that reflects the intention of the user.

In addition, according to the present embodiment, the controller 31 is configured such that the operator 15a that receives the forward traveling operation and the backward traveling operation of the user is an accelerator grip, returns to a predetermined reference position when no user operation is performed, moves in a first movement direction from the reference position in response to the forward traveling operation of the user, and moves in a second movement direction different from the first movement direction from the reference position in response to the backward traveling operation of the user. As described above, since the forward traveling and the backward traveling of the vehicle 1 can be performed by an operation with respect to one operator 15a, a forward traveling command and a backward traveling command are prevented from being simultaneously generated, and the operability is improved.

According to the present embodiment, the controller 31 obtains different regeneration amounts between the second regeneration control when the vehicle state is the forward traveling state and the second regeneration control in the case where the vehicle state is the backward traveling state. Therefore, the regeneration amount can be appropriately adjusted between a case where the vehicle is in the forward traveling state and a case where the vehicle is in the backward traveling state.

According to the present embodiment, the controller 31 determines a required torque required for the electric motor 6 to be equal to or less than a power running limiting torque at the time of the power running control, and determines a required torque required for the electric motor to be equal to or less than a regeneration limiting torque having a magnitude different from that of the power running limiting torque at the time of the regeneration control. Therefore, by making a range of the torque required for the electric motor 6 different between the power running control and the regeneration control, the required torque can be adjusted within an appropriate range. Accordingly, for example, the discharge current of the battery 3a and the charge current of the battery 3a can be adjusted within a range suitable for the specification of the battery 3a.

According to the present embodiment, the controller 31 acquires the battery state information related to the state of the battery 3a, and changes the power running limiting torque or the regeneration limiting torque based on the battery state information. The discharge current of the battery 3a and the charge current of the battery 3a can be adjusted within a range suitable for the state of the battery.

When the SOC of the battery is 100%, it is not preferable to further supply the charge current to the battery, and thus, in general, the regeneration limiting torque, which is a limiting value used at the time of the regeneration control, is set to zero. That is, when the SOC of the battery is 100%, a regenerative braking force is not normally generated. On the other hand, when the motor rotation speed is minute, an electromotive force of the motor is small and the charge current is small. According to the present embodiment, the controller 31 determines whether the vehicle state is a slow-speed traveling state in which a regeneration amount is equal to or less than a predetermined value based on the vehicle state information at the time of the regeneration control, and increases a regeneration limiting torque set in a case where it is determined that the vehicle state is the slow-speed traveling state as compared with a regeneration limiting torque set in a case where it is determined that the vehicle state is not the slow-speed traveling state. Therefore, even when the SOC of the battery is temporarily 100%, a regenerative braking force can be generated.

<Other Embodiments>

The present disclosure is not limited to the above embodiments, and the configuration may be changed, added, or deleted.

For example, the vehicle described in the above embodiment is an electric vehicle including one traveling driving source, but the vehicle is not limited thereto. The present disclosure is applicable to any vehicle including a driving source for forward/backward traveling. For example, the vehicle may be a hybrid vehicle including two traveling driving sources of an electric motor and an internal combustion engine. The vehicle may include a separate driving source as long as the vehicle includes a motor for forward/backward traveling. In addition, the straddle vehicle may not be a two-wheeled vehicle but may be a three-wheeled vehicle. In addition, the vehicle may not be a straddle vehicle, and may be, for example, a four-wheel vehicle. The vehicle may include a transmission that switches a transmission gear ratio. The vehicle may include a transmission capable of switching a reduction ratio. In addition, the vehicle may include an operator that receives a transmission gear operation by the user.

In the above embodiment, the mode switching between the normal traveling mode and the low-speed mode is executed in accordance with an operation of the mode switching switch, but the present disclosure is not limited thereto. That is, the mode switching may be executed in accordance with a predetermined mode switching condition. For example, instead of the dedicated mode switching switch, the mode switching may be executed by determining that a plurality of existing switches are operated simultaneously. A condition for switching from the normal traveling mode to the low-speed mode may be different from a condition for switching from the low-speed mode to the normal traveling mode.

In the above embodiment, the forward traveling operation or the backward traveling operation of the user in the low-speed mode is an operation for the torque command operator 15a, and the forward traveling operation or the backward traveling operation in the low-speed mode may be performed for a torque command operator different from the torque command operator 15a. An operator for the forward traveling operation and an operator for the backward traveling operation may be provided separately.

The operation information indicating the operation content of the user may include information indicating whether the normal traveling mode or the low-speed mode is selected as the control mode. In other words, the user operation of the forward traveling operation or the backward traveling operation by the user may also serve as a selection operation of the low-speed mode.

For example, the vehicle may include a low-speed forward button and a low-speed backward button, an operation of pressing the low-speed forward button may be a forward traveling operation in the low-speed mode, and an operation of pressing the low-speed backward button may be a backward traveling operation in the low-speed mode. For example, the vehicle may include a lever for low-speed operation, and the forward traveling operation or the backward traveling operation in the low-speed mode may be performed on the lever for low-speed operation. In this case, the lever for low-speed operation may be tiltable forward and backward from the reference position, and a forward tilting operation may be the forward traveling operation and a backward tilting operation may be the backward traveling operation. The lever for low-speed operation may be movable in an L-shape.

In the above embodiment, absolute values of set values of the parameters (i) to (vii) are different between the control executed in the forward traveling state and the control executed in the backward traveling state, but for some of these parameters, the absolute values of the set values may be the same between the control executed in the forward traveling state and the control executed in the backward traveling state. For example, in the above embodiment, start change rates $\alpha 1$ and $\beta 1$ and travel change rates $\alpha 2$ and $\beta 2$ are set, respectively, but the respective change rates $\alpha$ and $\beta$ may be set for the forward traveling and the backward traveling without being distinguished. Some of the parameters (i) to (vii) may not be set, and absolute values of set values of the other parameters may be different between the control executed in the forward traveling state and the control executed in the backward traveling state.

In the normal traveling mode, the output may be changed according to the torque command operator 15a, and the torque, the traveling speed, or the motor rotation speed may be changed. For example, in the normal traveling mode, instead of executing torque control for determining a required torque based on correspondence relation information indicating a correspondence relation between the accelerator operation amount and the torque described in the above embodiment, feedback control for bringing an actual vehicle speed close to a target vehicle speed may be executed, or feedback control for bringing an actual motor rotation speed close to a target motor rotation speed may be executed.

In the normal traveling mode, when the backward traveling operation is performed while the vehicle 1 is stopped, that is, when the torque command operator 15a pivots from the reference position by the second angle or more in the second movement direction R2, the vehicle 1 may not travel backward. In the normal traveling mode, when the backward traveling operation is performed while the vehicle 1 travels forward, that is, when the torque command operator 15a pivots from the reference position by the second angle or more in the second movement direction R2, a regenerative braking force may be generated in the electric motor 6 as in the second regeneration control in the low-speed mode to be described later.

In the low-speed mode, the traveling speed may be reduced compared to the normal traveling mode, and the torque, the traveling speed, or the motor rotation speed may be limited. For example, in the low-speed mode, instead of executing the feedback control for bringing the actual motor rotation speed close to the target motor rotation speed described in the above embodiment, feedback control for bringing the actual vehicle speed close to the target vehicle speed may be executed, or control for gradually changing an output torque of the electric motor 6 may be executed.

For example, the controller 31 may be configured to change an output torque of the electric motor in the positive direction at a first change rate in a case where it is determined that the user operation is the forward traveling operation, and to change an output torque of the electric motor in the reverse direction at a second change rate in a case where it is determined that the user operation is the backward traveling operation. In this case, the absolute value of the first change rate may be larger than the absolute value of the second change rate.

The present disclosure is also applicable to a vehicle that does not have a low-speed mode as a control mode. The present disclosure is applicable to a vehicle capable of traveling forward or backward in accordance with a user operation. The controller 31 may have a control mode other than the modes described in the above embodiment.

The control mode of the controller in the vehicle capable of forward/backward traveling may be a traveling mode in which the vehicle acceleration in the forward traveling direction when the user operation is determined to be the forward traveling operation is different from the vehicle acceleration in the backward traveling direction when the user operation is determined to be the backward traveling operation. In this case, an absolute value of the vehicle acceleration in the forward traveling direction may be set to be larger than an absolute value of the vehicle acceleration in the backward traveling direction.

In the above-described embodiment, when the vehicle state is the forward traveling state or the backward traveling state and the user operation is the reference position operation in the low-speed mode, torque control using correspondence relation information indicating a correspondence relation between the motor rotation speed and the torque is executed, but in this case, the rotation speed control may be executed instead of the torque control. That is, the first regeneration control may be rotation speed control. In other words, in the low-speed mode, in a case of the reference position operation in a state where the vehicle travels, the rotation speed control may be executed such that the target rotation speed gradually decreases at a predetermined third change rate γ by the low-speed rotation speed control unit

42c. In this case, the change rate may also be made different between the forward traveling and the backward traveling.

Control methods of the first regeneration control and the second regeneration control are not limited to those described in the above embodiment. The regeneration amount by the second regeneration control may be larger than the regeneration amount by the first regeneration control. For example, in the above embodiment, in the second regeneration control, the target rotation speed is set to zero, but the target rotation speed may be reduced to approach zero at a predetermined change rate. In this case, in the first regeneration control, the target rotation speed may be reduced to approach zero at a change rate having an absolute value smaller than that of the change rate in the second regeneration control.

In the above embodiment, even in the same control form, the absolute values of the set values of the parameters (i) to (vii) are different depending on whether the vehicle state is the forward traveling state or the backward traveling state, but absolute values of one or a plurality of set values of the parameters (i) to (vii) may be the same between the forward traveling state and the backward traveling state.

The present disclosure is also applicable to a case where a process related to some of the parameters (i) to (vii) is not executed.

For example, in the rotation speed control in the low-speed mode of the above embodiment, the change rate limiting filter process is executed on the time-series data of the actual rotation speed of the electric motor 6, but only the low-pass filter process may be executed on the time-series data of the actual rotation speed of the electric motor 6 without executing the change rate limiting filter process.

For example, in the rotation speed control in the low-speed mode according to the above embodiment, the deviation limiting process for limiting a change in the target rotation speed is executed so that the deviation between the target rotation speed and the actual rotation speed does not exceed a predetermined deviation limiting value, but the deviation limiting process may not be executed.

For example, in the rotation speed control in the low-speed mode according to the above embodiment, when the absolute value of the actual rotation speed exceeds the absolute value of the target rotation speed with a difference equal to or larger than a threshold value, the normal PID process is switched to the high-speed PID process for rapidly reducing the absolute value of the actual rotation speed as compared with the case where the normal PID process is executed.

In the above embodiment, the controller 31 acquires the motor rotation speed information indicating the motor rotation speed from the rotation speed sensor 22 that detects the rotation speed of the output shaft of the electric motor 6, but a method of acquiring the motor rotation speed information is not limited thereto. For example, the vehicle may include a wheel speed sensor that detects a rotation speed of a driving wheel, and the controller 31 may calculate the rotation speed of the electric motor 6 based on wheel speed information received from the wheel speed sensor. The vehicle state information acquisition unit 42a determines whether the vehicle state is the forward traveling state or the backward traveling state based on the motor rotation speed information, and may perform the determination from a detection value of the wheel speed sensor. In a state in which the electric motor 6 is stopped, there may be a situation where the vehicle is traveling forward and backward for inertia or a slope. Even in such a situation, the determination accuracy of the vehicle state is improved by determining the vehicle state using the detection value of the wheel speed sensor.

In the above embodiment, the PID feedback control is used as the rotation speed control, but other known feedback control may be used. Although the torque is used as a control amount, the rotation speed control may be executed using other control targets, for example, a battery current. Although the feedback control is preferable, a change rate of the rotation speed or the output torque of the motor at the time of forward/backward traveling may be varied depending on the feedforward control. When a current generated by a torque command is smaller than an allowable current, a function of the torque limiting unit may be omitted.

In the above embodiment, the comparison unit 63 determines whether the vehicle state is a predetermined slow-speed traveling state, and in a case where it is determined that the vehicle state is the slow-speed traveling state, the limitation on the required regeneration torque Tr is reduced as compared with a case where it is determined that the vehicle state is not the slow-speed traveling state, but the controller 31 may not execute such exception process in the slow-speed traveling state.

That is, even when the vehicle state is the slow-speed traveling state, the regeneration may be prohibited. A regeneration prohibition condition for prohibiting regeneration may be set for battery protection. Whether the regeneration prohibition condition is satisfied may be determined based on, for example, the SOC or the battery temperature. The regeneration prohibition condition may include a condition that the SOC is equal to or higher than a predetermined value, or a condition that the battery temperature is equal to or higher than a predetermined temperature. When a regeneration command is given to the controller by a user operation, the controller may determine whether the regeneration prohibition condition is satisfied, and may invalidate the regeneration command when the regeneration prohibition condition is satisfied. For example, when the SOC is close to 100% or the battery temperature is in a predetermined regeneration prohibition temperature range, the regeneration command may be invalidated.

A torque limiting reduction process for reducing a limit on the required regeneration torque Tr when the vehicle state is a predetermined slow-speed traveling state may be used only for the control of moving the vehicle forward or only for the control of moving the vehicle backward. Specifically, the controller may be configured to execute a torque limiting reduction process for reducing a limit on the required regeneration torque in a case where it is determined that the vehicle state is one of a slow-speed traveling state in the forward traveling direction and a slow-speed traveling state in the backward traveling direction as compared with a case where it is determined that the vehicle state is not the slow-speed traveling state, and not to execute the torque limiting reduction process in a case where it is determined that the vehicle state is the other slow-speed state. The process for reducing a limit on the required regeneration torque Tr when the vehicle state is a predetermined slow-speed traveling state is also applicable to a vehicle that does not travel backward.

In the above embodiment, the regeneration amount by the second regeneration control is larger than the regeneration amount by the first regeneration control regardless of whether the vehicle state is the forward traveling state or the backward traveling state, but the regeneration amount by the second regeneration control may be larger than the regeneration amount by the first regeneration control only when the vehicle state is one of the forward traveling state and the backward traveling state. When the vehicle state is one of the forward traveling state and the backward traveling state, one of the first regeneration control and the second regeneration control may not be executed.

In the above embodiment, in a state where it is determined that the forward traveling operation or the backward traveling operation is performed, the regeneration amount is set to a constant regeneration amount regardless of an operation amount of the torque command operator, but the present disclosure is not limited thereto. For example, the regeneration amount may be increased as the operation amount of the torque command operator increases.

The meter device 18 may display information indicating a regeneration control state in which the regeneration control is executed. In this case, the controller 31 sends, to the meter device 18, a command for displaying the regeneration control state. In addition, when displaying the regeneration control state, the meter device 18 may make a display mode different between a state in which the regenerative braking is strong and a state in which the regenerative braking is weak. In this case, the controller 31 sends, to the meter device 18, information indicating whether the regenerative braking is strong or weak.

The meter device 18 may display information indicating that the control mode is the low-speed mode. In this case, the controller 31 sends, to the meter device 18, a command for indicating the low-speed mode. The meter device 18 may display whether the vehicle is in the forward traveling state or the backward traveling state in a distinguishable manner when displaying the low-speed mode. In this case, the controller 31 sends the vehicle state information to the meter device 18. In addition, the meter device 18 may display whether the user operation is the forward traveling operation or the backward traveling operation in a distinguishable manner. In this case, the controller 31 sends, to the meter device 18, operation information indicating an operation content of the user for the torque command operator 15*a*.

Each of the control units 41 to 43 may be implemented by an individual circuit. The controller may read a program corresponding to an operation of each control unit to implement the function of each control unit.

The functions of the elements disclosed in the present specification can be executed by using a general-purpose processor, a dedicated processor, an integrated circuit, an application specific integrated circuit (ASIC), a circuit of the related art, or a circuit or a processing circuitry that include a combination thereof, which are configured or programmed to execute the disclosed functions. Since the processor includes a transistor and other circuits, the processor is regarded as a processing circuitry or a circuit. In the present disclosure, a circuit, a unit, or means is hardware that executes the listed functions or hardware that is programmed to execute the listed functions. The hardware may be hardware disclosed in the present specification, or may be other known hardware that is configured or programmed to execute the listed functions. When the hardware is a processor considered to be a type of circuit, the circuit, the means, or the unit is a combination of hardware and software, and the software is used for the configuration of the hardware or the processor.

The program including commands to execute the method disclosed in the present specification may be stored in a non-transitory computer-readable storage medium. The non-transitory computer-readable storage medium includes, for example, a magnetic disk such as a hard disk drive, an optical disk such as a CD-ROM, a DVD disk, and a Blu-ray disk, a read-only memory (ROM), a random access memory (RAM), an EPROM, an EEPROM, a magnetic card, a flash memory, an optical card, and any type of medium suitable for storing an electronic command.

[Embodiment]

The following aspects are disclosures of preferred embodiments.

According to a first aspect of the present disclosure, a straddle vehicle includes: a vehicle body; an electric motor mounted on the vehicle body as a driving source and rotatable in positive and reverse directions; a battery mounted on the vehicle body and configured to supply electric power to the electric motor; and a processing circuitry configured to control the electric motor. The processing circuitry is configured to: acquire vehicle state information capable of determining whether a vehicle state of the straddle vehicle is a forward traveling state or a backward traveling state, and operation information capable of determining whether a user operation is a forward traveling operation or a backward traveling operation; and switch between power running control and regeneration control based on the vehicle state information and the operation information.

According to the above configuration, it is possible to realize travel control suitable for each of the forward/backward traveling state of the vehicle and each state of the user operation. Accordingly, the feeling felt by the user when the vehicle is operated to travel can be brought close to the feeling intended by the user.

According to a second aspect of the present disclosure, in the first aspect, based on the vehicle state information and the operation information, the processing circuitry is configured to: execute power running control in a case where the processing circuitry determines that the vehicle state is the forward traveling state and the user operation is the forward traveling operation, or in a case where the processing circuitry determines that the vehicle state is the backward traveling state and the user operation is the backward traveling operation; and execute regeneration control in a case where the processing circuitry determines that the vehicle state is the forward traveling state and the user operation is the backward traveling operation, or in a case where the processing circuitry determines that the vehicle state is the backward traveling state and the user operation is the forward traveling operation.

According to a third aspect of the present disclosure, in the first aspect or the second aspect, the operation information is information capable of determining whether the user operation is a reference position operation different from the forward traveling operation and the backward traveling operation in addition to whether the user operation is the forward traveling operation or the backward traveling operation. The processing circuitry is configured to: execute regeneration control in a case where the processing circuitry determines that the vehicle state is the forward traveling state or the backward traveling state and the user operation is the reference position operation, and execute regeneration control for generating a regenerative braking force larger than a regenerative braking force in the regeneration control when the vehicle state is determined as being the reference position operation, in the case where the processing circuitry determines that the vehicle state is the forward traveling state and the user operation is the backward traveling operation or in the case where the processing circuitry determines that the vehicle state is the backward traveling state and the user operation is the forward traveling operation.

According to the above configuration, it is easy to realize regeneration that reflects the intention of the user.

According to a fourth aspect of the present disclosure, in any one of the first to third aspects, the processing circuitry is configured to execute regeneration control such that a rotation speed of the electric motor is zero, in the case where the processing circuitry determines that the vehicle state is the forward traveling state and the user operation is the backward traveling operation, or in the case where the processing circuitry determines that the vehicle state is the backward traveling state and the user operation is the forward traveling operation.

According to the above configuration, it is easy to realize regeneration that reflects the intention of the user.

According to a fifth aspect of the present disclosure, in any one of the first to fourth aspects, the straddle vehicle further includes an operator configured to receive the forward traveling operation and the backward traveling operation by a user. The operator is configured to return to a predetermined reference position when no user operation is performed, move in a first movement direction from the reference position in response to the forward traveling operation by the user, and move in a second movement direction different from the first movement direction from the reference position in response to the backward traveling operation by the user.

According to the above configuration, since the forward traveling and the backward traveling of the vehicle can be performed by an operation for one operator, a forward traveling command and a backward traveling command are prevented from being simultaneously generated, and the operability is improved.

According to a sixth aspect of the present disclosure, in any one of the first to fifth aspects, a regeneration amount obtained by the regeneration control is different between the case where the processing circuitry determines that the vehicle state is the forward traveling state and the user operation is the backward traveling operation and the case where the processing circuitry determines that the vehicle state is the backward traveling state and the user operation is the forward traveling operation.

According to the above configuration, the regeneration amount can be appropriately adjusted between the case where the vehicle is in the forward traveling state and the case where the vehicle is in the backward traveling state.

According to a seventh aspect of the present disclosure, in any one of the first to sixth aspects, the processing circuitry is configured to: determine a required torque required for the electric motor to be equal to or less than a power running limiting torque at the time of the power running control; and determine a required torque required for the electric motor to be equal to or less than a regeneration limiting torque having a magnitude different from a magnitude of the power running limiting torque at the time of the regeneration control.

According to the above configuration, by making a range of the torque required for the electric motor different between the power running control and the regeneration control, the required torque can be adjusted within an appropriate range. Accordingly, for example, the discharge current of the battery and the charge current of the battery can be adjusted within a range suitable for the specification of the battery.

According to an eighth aspect of the present disclosure, in the seventh aspect, the processing circuitry is configured to: acquire battery state information related to a state of the battery; and change the power running limiting torque or the regeneration limiting torque based on the battery state information.

According to the above configuration, the discharge current of the battery and the charge current of the battery can be adjusted within a range suitable for the state of the battery.

According to a ninth aspect of the present disclosure, in the seventh aspect or the eighth aspect, the processing circuitry is configured to: determine whether the vehicle state is a slow-speed traveling state in which a regeneration amount is equal to or less than a predetermined value based on the vehicle state information at the time of the regeneration control; and increase a regeneration limiting torque set in a case where the processing circuitry determines that the vehicle state is the slow-speed traveling state as compared with a regeneration limiting torque set in a case where the processing circuitry determines that the vehicle state is not the slow-speed traveling state.

When the SOC of the battery is 100%, it is not preferable to further supply the charge current to the battery, and thus, in general, the regeneration limiting torque, which is a limiting value used at the time of the regeneration control, is set to zero. That is, when the SOC of the battery is 100%, a regenerative braking force is not normally generated. On the other hand, when the motor rotation speed is minute, an electromotive force of the motor is small and the charge current is small. According to the above configuration, since the regeneration limiting torque set in a case where it is determined that the vehicle state is the slow-speed traveling state is larger than the regeneration limiting torque set in a case where it is determined that the vehicle state is not the slow-speed traveling state, it is possible to generate a regenerative braking force even when the SOC of the battery is temporarily 100%.

According to a tenth aspect of the present disclosure, a straddle vehicle includes: vehicle body; an electric motor mounted on the vehicle body as a driving source; a battery mounted on the vehicle body and configured to supply electric power to the electric motor; and a processing circuitry configured to control the electric motor. The processing circuitry is configured to: determine whether the vehicle state is a slow-speed traveling state in which a regeneration amount is equal to or less than a predetermined value based on the vehicle state information at the time of the regeneration control; limit a required regeneration torque, which is a regeneration torque required for the electric motor, in a case where the processing circuitry determines that the vehicle state is not the slow-speed traveling state; and reduce a limit on the required regeneration torque in a case where the processing circuitry determines that the vehicle state is the slow-speed traveling state as compared with the case where the processing circuitry determines that the vehicle state is not the slow-speed traveling state.

According to the above configuration, it is easy to maintain the regenerative braking even at the time of low-speed forward traveling.

According to an eleventh aspect of the present disclosure, a straddle vehicle includes: a vehicle body; an electric motor mounted on the vehicle body as a driving source; a battery mounted on the vehicle body and configured to supply electric power to the electric motor; an operator configured to: receive a first movement operation performed by a user, and move in a first direction with respect to a reference position; and receive a second movement operation performed by the user, and move in a second direction with respect to the reference position; and a processing circuitry configured to control the electric motor. The processing circuitry is configured to: execute power running control in a case where the vehicle state is a traveling state and a user operation is the first movement operation; execute first regeneration control in a case where the vehicle state is the traveling state and the user operation is a reference position operation; and execute second regeneration control when the vehicle state is the traveling state and the user operation is the second movement operation. A regeneration amount by the second regeneration control is larger than a regeneration amount by the first regeneration control.

According to the above configuration, since the adjustment of the regeneration amount can be adjusted in two stages by the operation for one operator, the operability is improved.

According to a twelfth aspect of the present disclosure, a method for controlling a vehicle including an electric motor rotatable in positive and reverse directions and a processing circuitry, which is executed in the processing circuitry, includes: acquiring vehicle state information capable of determining whether a vehicle state of the vehicle is a forward traveling state or a backward traveling state and operation information capable of determining whether a user operation is a forward traveling operation or a backward traveling operation; and switching between power running control and regeneration control based on the vehicle state information and the operation information.

What is claimed is:

1. A straddle vehicle comprising:

a vehicle body;

an electric motor mounted on the vehicle body as a driving source and rotatable in positive and reverse directions;

a battery mounted on the vehicle body and configured to supply electric power to the electric motor;

a torque command operator configured to:

receive a first movement operation performed by a user, and move in a first direction with respect to a reference position; and receive a second movement operation performed by the user, and move in a second direction with respect to the reference position; and a processing circuitry configured to control the electric motor, wherein the processing circuitry is configured to:

acquire vehicle state information capable of determining whether a vehicle state of the straddle vehicle is a forward traveling state or a backward traveling state, and operation information capable of determining whether a user operation is a first movement operation or a second movement operation; and switch between power running control and regeneration control based on the vehicle state information and the operation information, and the processing circuitry is configured to:

execute power running control of enhancing a forward movement of the straddle vehicle in a case where the vehicle state is a forward traveling state and a user operation is the first movement operation;

execute power running control of enhancing a backward movement of the straddle vehicle in a case where the vehicle state is a backward traveling state and a user operation is second first movement operation;

execute regeneration control of suppressing the forward movement in a case where the vehicle state is the forward traveling state and the user operation is the second movement operation; and execute regeneration control of suppressing the backward movement in a case where the vehicle state is the backward traveling state and the user operation is the first movement operation.

2. The straddle vehicle according to claim 1, wherein the operation information is information capable of determining whether the user operation is a reference position operation different from the first movement operation and the second movement operation in addition to whether the user operation is the first movement operation or the second movement operation, and the processing circuitry is configured to:

execute regeneration control in a case where the processing circuitry determines that the vehicle state is the forward traveling state or the backward traveling state and the user operation is the reference position operation, and execute regeneration control for generating a regenerative braking force larger than a regenerative braking force in the regeneration control when the vehicle state is determined as being the reference position operation, in a case where the processing circuitry determines that the vehicle state is the forward traveling state and the user operation is the second movement operation, or in a case where the processing circuitry determines that the vehicle state is the backward traveling state and the user operation is the first movement operation.

3. The straddle vehicle according to claim 1, wherein the processing circuitry is configured to execute regeneration control such that a rotation speed of the electric motor is zero, in the case where the processing circuitry determines that the vehicle state is the forward traveling state and the user operation is the second movement operation, or in the case where the processing circuitry determines that the vehicle state is the backward traveling state and the user operation is the first movement operation.

4. The straddle vehicle according to claim 1, further comprising an operator configured to receive the first movement operation and the second movement operation by a user, wherein the operator is configured to return to a predetermined reference position when no user operation is performed, move in a first movement direction from the reference position in response to the first movement operation by the user, and move in a second movement direction different from the first movement direction from the reference position in response to the second movement operation by the user.

5. The straddle vehicle according to claim 1, wherein a regeneration amount obtained by the regeneration control is different between a case where the processing circuitry determines that the vehicle state is the forward traveling state and the user operation is the second movement operation, and a case where the processing circuitry determines that the vehicle state is the backward traveling state and the user operation is the first movement operation.

6. The straddle vehicle according to claim 1, wherein the processing circuitry is configured to:

execute first regeneration control which is different from the regeneration control in a case where the vehicle state is the forward traveling state or the backward traveling state and the user operation is a reference position operation, and a regeneration amount by the regeneration control is larger than a regeneration amount by the first regeneration control.

7. The straddle vehicle according to claim 1, wherein the first movement operation is an operation of rotating the torque command operator to one side in a circumferential direction with respect to the reference position, and the second movement operation is an operation of rotating the torque command operator to an other side in the circumferential direction with respect to the reference position.

8. The straddle vehicle according to claim 1, further comprising:

a mode switching switch configured to receive a user operation for switching a control mode of the processing circuitry between a normal traveling mode and a low-speed mode, wherein the processing circuitry is configured to:

switch the control mode of the processing circuitry between the normal traveling mode and the low-speed mode, based on a mode switching signal received from the mode switching switch, and accept the backward movement of the straddle vehicle by the mode switching switch being operated.

9. The straddle vehicle according to claim 8, wherein the mode switching switch is configured to transmit the mode switching signal to the processing circuitry when the user continues to press the mode switching switch for a predetermined time.

10. The straddle vehicle according to claim 8, further comprising:

a steering wheel extending in a left-right direction, wherein the mode switching switch is located on an opposite side of the torque command operator with respect to the steering wheel.

11. The straddle vehicle according to claim 1, further comprising:

a mode switching switch configured to receive a user operation for switching a control mode of the processing circuitry between a normal traveling mode and a low-speed mode, wherein the processing circuitry is configured to:

switch the control mode of the processing circuitry between the normal traveling mode and the low-speed mode, based on a mode switching signal received from the mode switching switch, and accept the backward movement of the straddle vehicle by the mode switching switch being operated and vehicle speed of the straddle vehicle being equal to or lower than a predetermined speed.

12. A straddle vehicle comprising:

a vehicle body;

an electric motor mounted on the vehicle body as a driving source and rotatable in positive and reverse directions;

a battery mounted on the vehicle body and configured to supply electric power to the electric motor; and a processing circuitry configured to control the electric motor, wherein the processing circuitry is configured to:

acquire vehicle state information capable of determining whether a vehicle state of the straddle vehicle is a forward traveling state or a backward traveling state, and operation information capable of determining a user operation; and switch between power running control and regeneration control based on the vehicle state information and the operation information, and the processing circuitry is configured to:

determine a required torque required for the electric motor to be equal to or less than a power running limiting torque at a time of the power running control; and determine a required torque required for the electric motor to be equal to or less than a regeneration limiting torque having a magnitude different from a magnitude of the power running limiting torque at the time of the regeneration control.

13. The straddle vehicle according to claim 12, wherein the processing circuitry is configured to:

acquire battery state information related to a state of the battery; and change the power running limiting torque or the regeneration limiting torque based on the battery state information.

14. The straddle vehicle according to claim 12, wherein the processing circuitry is configured to:

determine whether the vehicle state is a slow-speed traveling state in which a regeneration amount is equal to or less than a predetermined value based on the vehicle state information at the time of the regeneration control; and increase a regeneration limiting torque set in a case where the processing circuitry determines that the vehicle state is the slow-speed traveling state as compared with a regeneration limiting torque set in a case where the processing circuitry determines that the vehicle state is not the slow-speed traveling state.

15. A straddle vehicle comprising:

a vehicle body;

an electric motor mounted on the vehicle body as a driving source;

a battery mounted on the vehicle body and configured to supply electric power to the electric motor; and a processing circuitry configured to control the electric motor, wherein the processing circuitry is configured to:

determine whether a vehicle state is a slow-speed traveling state in which a regeneration amount is equal to or less than a predetermined value based on a vehicle state information at a time of the regeneration control;

limit a required regeneration torque, which is a regeneration torque required for the electric motor, in a case where the processing circuitry determines that the vehicle state is not the slow-speed traveling state; and reduce a limit on the required regeneration torque in a case where the processing circuitry determines that the vehicle state is the slow-speed traveling state as compared with the case where the processing circuitry determines that the vehicle state is not the slow-speed traveling state.

16. A method for controlling a vehicle including: an electric motor rotatable in positive and reverse directions; a torque command operator configured to receive a first movement operation performed by a user, and move in a first direction with respect to a reference position, and receive a second movement operation performed by the user, and move in a second direction with respect to the reference position; and a processing circuitry, the method being executed in the processing circuitry, the method comprising:

acquiring vehicle state information capable of determining whether a vehicle state of the vehicle is a forward traveling state or a backward traveling state and operation information capable of determining whether a user operation is a first movement operation or a second movement operation;

switching between power running control and regeneration control based on the vehicle state information and the operation information;

executing power running control of enhancing a forward movement of a straddle vehicle in a case where the vehicle state is a forward traveling state and a user operation is the first movement operation;

executing power running control of enhancing a backward movement of the straddle vehicle in a case where the vehicle state is a backward traveling state and a user operation is second first movement operation;

executing regeneration control of suppressing the forward movement in a case where the vehicle state is the forward traveling state and the user operation is the second movement operation; and executing regeneration control of suppressing the backward movement in a case where the vehicle state is the backward traveling state and the user operation is the first movement operation.

* * * * *